United States Patent
Chhaya et al.

(10) Patent No.: US 11,475,223 B2
(45) Date of Patent: Oct. 18, 2022

(54) CONVERTING TONE OF DIGITAL CONTENT

(71) Applicant: Adobe Inc., San Jose, CA (US)

(72) Inventors: Niyati Himanshu Chhaya, Hyderabad (IN); Pranav Ravindra Manerikar, Bangalore (IN); Sopan Khosla, Bengaluru (IN)

(73) Assignee: Adobe Inc., San Jose, CA (US)

( * ) Notice: Subject to any disclaimer, the term of this patent is extended or adjusted under 35 U.S.C. 154(b) by 177 days.

(21) Appl. No.: 16/526,266

(22) Filed: Jul. 30, 2019

(65) Prior Publication Data

US 2021/0034705 A1 Feb. 4, 2021

(51) Int. Cl.
*G06F 40/30* (2020.01)
*G06N 3/04* (2006.01)
*G06N 3/08* (2006.01)
*G06F 40/205* (2020.01)
*G06F 40/253* (2020.01)

(52) U.S. Cl.
CPC ............ *G06F 40/30* (2020.01); *G06F 40/205* (2020.01); *G06F 40/253* (2020.01); *G06N 3/04* (2013.01); *G06N 3/08* (2013.01)

(58) Field of Classification Search
CPC ...... G06F 40/30; G06F 40/166; G06F 40/253; G06F 40/35; G06F 40/20
See application file for complete search history.

(56) References Cited

U.S. PATENT DOCUMENTS

| 7,890,860 B1* | 2/2011 | Thrasher | G06F 40/166 715/260 |
| 2005/0075880 A1* | 4/2005 | Pickover | G06F 40/30 704/270 |
| 2006/0069728 A1* | 3/2006 | McEvilly | G06F 40/166 709/206 |

(Continued)

OTHER PUBLICATIONS

John et al., "Disentangled representation learning for non-parallel text style transfer." arXiv preprint arXiv:1808.04339 (Year: 2018).*

(Continued)

*Primary Examiner* — Samuel G Neway
(74) *Attorney, Agent, or Firm* — Finch & Maloney PLLC

(57) ABSTRACT

Techniques are disclosed for generating an output sentence from an input sentence by replacing an input tone of the input sentence with a target tone. For example, an input sentence is parsed to separate semantic meaning of the input sentence from the tone of the input sentence. The input tone is indicative of one or more characteristics of the input sentence, such as politeness, formality, humor, anger, etc. in the input sentence, and thus, a measure of the input tone is a measure of such characteristics of the input sentence. An output sentence is generated based on the semantic meaning of the input sentence and a target tone, such that the output sentence and the input sentence have similar semantic meaning, and the output sentence has the target tone that is different from the input tone of the input sentence. In an example, a neural network for parsing the input sentence and/or generating the output sentence is trained using non-parallel corpora of training data that includes a plurality of input sentences and corresponding plurality of assigned tones.

20 Claims, 8 Drawing Sheets

(56) References Cited

U.S. PATENT DOCUMENTS

| | | | | |
|---|---|---|---|---|
| 2009/0313274 | A1* | 12/2009 | Chen | H04L 67/306 |
| 2017/0161245 | A1* | 6/2017 | Han | G06F 40/166 |
| 2017/0185591 | A1* | 6/2017 | Tetreault | G06F 40/253 |
| 2017/0345411 | A1* | 11/2017 | Raitio | G10L 13/0335 |
| 2017/0364508 | A1* | 12/2017 | Abrahams | G06N 5/041 |
| 2018/0217968 | A1* | 8/2018 | Bastide | G06F 40/151 |
| 2018/0373697 | A1* | 12/2018 | Jain | G06F 40/30 |
| 2019/0121842 | A1* | 4/2019 | Catalano | G06F 40/253 |
| 2019/0149494 | A1* | 5/2019 | Anders | H04W 4/12 704/9 |
| 2020/0073947 | A1* | 3/2020 | Bertoldi | G06F 40/47 |
| 2020/0082806 | A1* | 3/2020 | Kim | G06N 3/084 |
| 2020/0311195 | A1* | 10/2020 | Mishra | G06F 40/253 |
| 2021/0034705 | A1* | 2/2021 | Chhaya | G06F 40/253 |
| 2021/0206382 | A1 | 7/2021 | Nakada | |

OTHER PUBLICATIONS

Subramanian et al., "Multiple-attribute text style transfer." arXiv preprint arXiv:1811.00552 (Year: 2018).*

Santos et al., "Fighting offensive language on social media with unsupervised text style transfer." arXiv preprint arXiv:1805.07685. (Year: 2018).*

Niu, T and M Bansal, "Polite Dialogue Generation Without Parallel Data", Transactions of the Association for Computational Linguistics, 2018, vol. 6, pp. 373-389.

Jhamtani et al., "Shakespearizing Modern Language Using Copy-Enriched Sequence-to-Sequence Models", Proceedings of the Workshop on Stylistic Variation, 2017 Association for Computational Linguistics, Sep. 2017, pp. 10-19.

Ouyang et al., "Developing learning strategies for topic-based summarization", Proceedings of the sixteenth ACM conference on Conference on information and knowledge management, ACM, Nov. 2007, pp. 79-86.

Ghosh et al., "Affect-LM: A neural language model for customizable affective text generation", Proceedings of the 55th Annual Meeting of the Association for Computational Linguistics, 2017 Association for Computational Linguistics (ACL), 2017, pp. 634-642.

High, Rob, "The era of cognitive systems: An inside look at IBM Watson and how it works", IBM Corporation, Redbooks, 2012, 16 pages.

Luong et al., "Effective approaches to attention-based neural machine translation", arXiv:1508.04025v5, Sep. 20, 2015, 11 pages.

Bishop, Christopher M., Mixture density networks, Neural Computing Research Group Report: NCRG/94/004, Available from: http://www.ncrg.aston.ac.uk/, Feb. 1994, 26 pages.

Williams, R. J. and D. Zipser, "A learning algorithm for continually running fully recurrent neural networks", 1989, Neural computation, vol. 1, pp. 270-280.

Cho et al., "Learning phrase representations using RNN encoder-decoder for statistical machine translation", arXiv:1406.1078v3, Sep. 3, 2014, 15 pages.

Kingma D. P and J. L. Ba, "Adam: A method for stochastic optimization", arXiv:1412.6980v9, Jan. 30, 2017, 15 pages.

Danescu-Niculescu-Mizil et al., "A computational approach to politeness with application to social factors", Proceedings of ACL, 2013, 10 pages.

U.S. Appl. No. 16/024,131, filed Jun. 29, 2018.

Chhaya et al., "Frustrated, Polite or Formal: Quantifying Feelings and Tone in Emails", 2018, Proceedings of the Second Workshop on Computational Modeling of People's Opinions, Personality, and Emotions in Social Media, 2018 Association for Computational Linguistics, pp. 76-86.

U.S. Appl. No. 15/945,996, filed Apr. 5, 2018.

* cited by examiner

Original Text (low politeness)

Guests will see super suit designer Jone Doe and see some of her greatest creations. The photo opportunity with Jane Doe that used to reside on ABC place will be moved to the front of the XYZ racing academy.

Modified Text (medium politeness)

Guests can hope to meet super suit designer Jone Doe and be able to see some of her greatest creations. We wish to move the photo opportunity with Jane Doe that used to reside on ABC place to the front of the XYZ racing academy.

FIG. 6

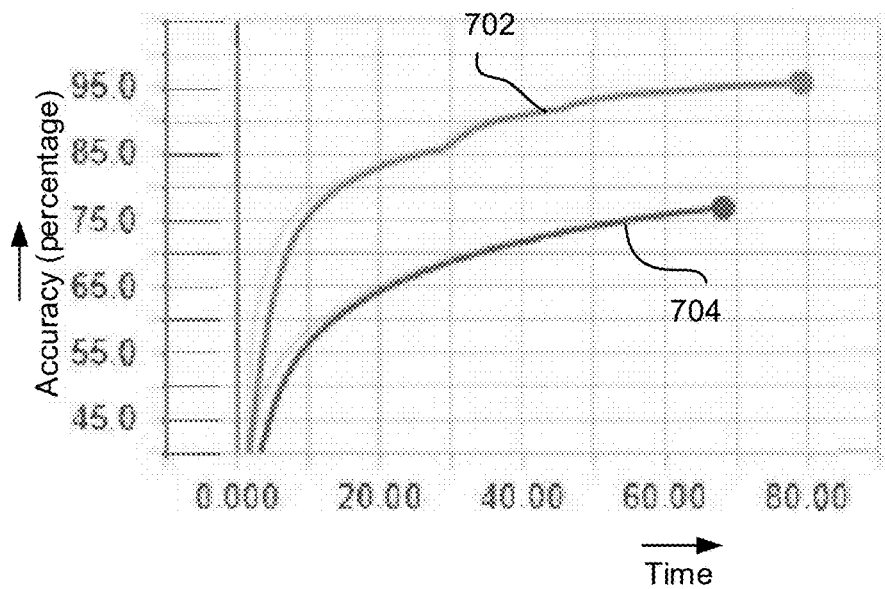

FIG. 7

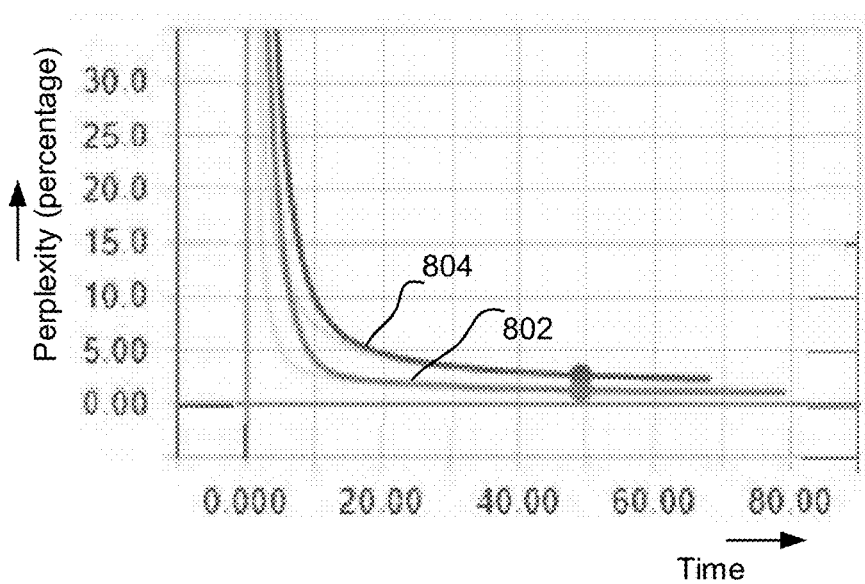

FIG. 8

CONVERTING TONE OF DIGITAL CONTENT

FIELD OF THE DISCLOSURE

This disclosure relates generally to processing of digital content, and more specifically to techniques for modifying the tone of digital content, without substantially modifying semantic meaning of the digital content.

BACKGROUND

Digital content can be distributed among a vast number of people around the world. Consumers of digital content can vary widely, and language tone preferences of the consumers can also vary widely based on factors such as geolocation, age, familiarity with products and brands, proficiency in the languages of communication, and cultural backgrounds. Thus, while the semantic meaning of two communications can be effectively the same, the tone of those two communications can vary greatly. In this manner, semantic meaning can be thought of as tone-independent. For example, certain demographics may prefer consistently polite language, whereas other demographics might find such consistently polite content somewhat insincere. Teenagers, for instance, may prefer slang or otherwise relatively lower levels of formality when communicating a given message, whereas military personnel might prefer relatively higher levels of formality when communicating a semantically similar message. Thus, digital content created for one group of consumers having specific tone preferences (e.g., with respect to politeness and/or formality) in the digital content may not be tone-appropriate for a different group of consumers having different preferences.

BRIEF DESCRIPTION OF THE DRAWINGS

FIG. 6 illustrates example original text and corresponding example modified text generated by a tone modification system, where the original text has is perceived by the tone modification system as having a low level of politeness, and the modified text has the same semantic meaning as the original text and is perceived by the tone modification module as having a relatively higher level of politeness, in accordance with some embodiments.

FIG. 7 illustrates plots depicting an accuracy in reconstructing output sentences by a tone modification system to have the same semantic meaning as corresponding input sentences, in accordance with some embodiments.

FIG. 8 illustrates plots depicting a measure of perplexity in reconstructing output sentences by a tone modification system, in accordance with some embodiments.

DETAILED DESCRIPTION

Figure 1:
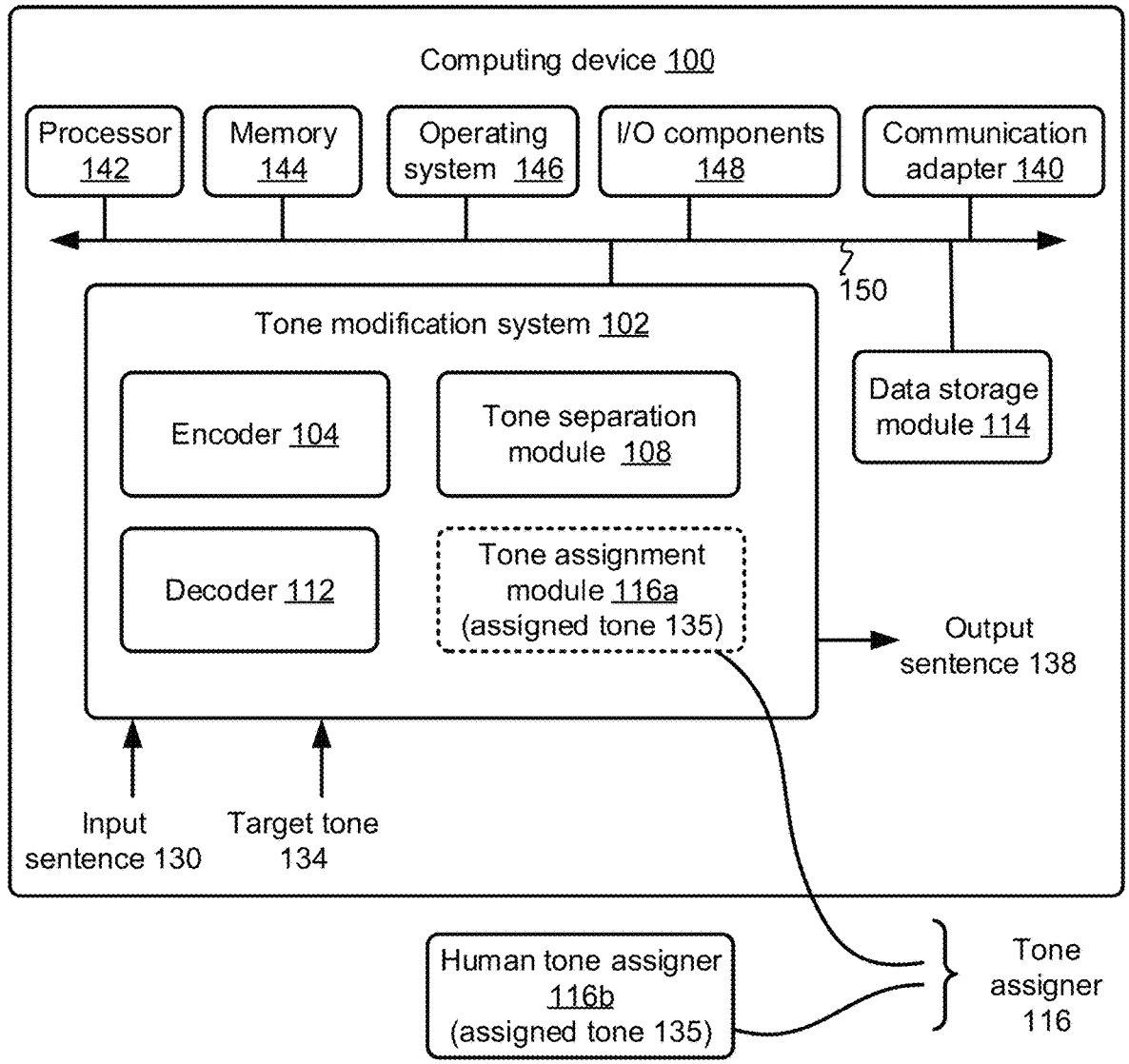
FIG. 1 is a block diagram schematically illustrating selected components of an example computing device configured to change a tone of one or more sentences, in accordance with some embodiments.

Techniques are disclosed for modifying tone of digital content, without substantially modifying the underlying semantic meaning of the digital content. Thus, the modified digital content still conveys a similar idea or subject matter as compared to the original digital content. In this manner, a semantic meaning that is common to different messages each having a different tone can be thought of as tone-independent semantic meaning. So, it is possible to change the tone of a message without substantially impacting the semantic meaning of that message. Note, however, that reference herein to messages having the same semantic meaning but different tones is not intended to implicate a rigid level of precision as to the sameness of the message meaning. Indeed, the semantic meaning of a tone-modified message may vary from the original meaning to some degree. Such variance in semantic meaning, whether it be intentional or unintentional, may be acceptable according to some embodiments of the present disclosure, and as will be appreciated in light of the complexities of human language.

The disclosed techniques can be embodied in a tone modification system, programmed or otherwise configured to modify tone of digital content. The digital content input to the system can be, for example, one or more sentences, phrases, texts, or paragraphs having a specific original tone. The original tone is indicative of one or more features or characteristics associated with the digital content, such as the degree of politeness and/or formality in the digital content, according to some embodiments. Although various embodiments and use cases provided herein discuss tone in terms of example characteristics such as politeness and/or formality, such discussion is not intended to limit the scope of this disclosure. For instance, tone may also be indicative of other characteristics, such as anger, humor, cheerfulness, verbosity, complexity, intensity, and/or any other such characteristic of the digital content that is separable from and independent of the semantic meaning of that content.

The target tone of the modified digital content may be intentionally fine-tuned to the tone preference of a target recipient or group intended to consume the modified digital content. In some embodiments, variants of the original digital content having various target tones are automatically generated, wherein each variant can be used for a different recipient group, as will be explained in turn. Thus, a given input message having a tone-independent semantic meaning can be processed into any number of tone-modified messages each having that same tone-independent semantic meaning, but a different tone. Each such tone-modified message can in turn be communicated to a target audience known to have a preference for the tone corresponding to that message. Such message processing and transmission can be done in real-time, or on a scheduled or otherwise as-needed basis. In some such cases, the tone-modified messages are created and stored in advance of their communication to a target audience.

As noted above, deep learning can be used to assess tone, which may bring a greater degree of consistency and predictability to the tone assessment. In some such embodiments, a sequence-to-sequence (seq2seq) neural network model is trained to extract and identify tone, using non-parallel corpora of training data. This means that the neural network does not require parallel pairs for training data, such as pairs of corresponding polite and impolite sentences. Instead, the neural network can be trained using non-parallel pairs. In more detail, and according to one such embodiment, the training data includes a first input sentence and a first assigned tone, a second input sentence and a second assigned tone, and so on, wherein each pair includes an input digital content and a corresponding assigned tone. Thus, the requisite balance of parallel corpora (such as complementary training pairs that include a polite tone sentence and a non-polite tone sentence) is advantageously not needed.

As will be discussed in further detail herein, the training data making up the non-parallel corpus may be generated, for example, by a tone assigner, in advance of any training sessions, or in real-time. In an example embodiment, the tone assigner may be implemented in software as a tone assignment module that is internal to, or external to, the sequence-to-sequence neural network framework to be trained using the training data. In such cases, the tone assignment module is programmed or otherwise configured to determine a tone of a given input sentence and assign that tone to the sentence. In another example embodiment, the tone assigner may be a human tagger who receives an input sentence of the training data and determines/assigns a corresponding tone to the input sentence. In still other embodiments, training data can be generated using a combination of such automated and manual tone assignment processes, as will be appreciated.

In accordance with an embodiment, a tone modification system includes a trained neural network model that operates to extract tone (e.g., politeness) information from an input sentence. In one such embodiment, the neural network is a bidirectional seq2seq neural network with attention, although any neural network model trainable for this purpose can be used, as will be appreciated in light of this disclosure. In any case, a target tone information is concatenated with a tone-independent hidden state generated as an intermediate representation by an encoder and a tone separation module in the seq2seq model. This tone-independent hidden state corresponds to the tone-independent semantic meaning of the input sentence. The decoder in the seq2seq model is trained to reconstruct the input sentence using the tone-independent representation and target tone information. In order to generate sentences with the same semantic meaning but with different tone information, the tone modification system is further configured to replace the original tone with the desired target tone, or otherwise modify the original tone. Thus, the output sentence generated by the tone modification system, e.g., by the decoder, has tone-independent semantic meaning of the input sentence, but with the target tone. The target tone can be, for example, user-supplied or automatically selected based on, for instance, demographic data associated with the target audience.

In more detail, the seq2seq framework relies on an encoder-decoder paradigm. The tone modification system according to some such embodiments comprises an encoder that receives an input digital content, such as an input sentence. Some of the examples and embodiments herein assume that the input digital content comprises one or more input sentences—however, this is not intended to limit the scope of the present disclosure, and the principles of this disclosure can be applied to change the tone of any other digital content, such as phrases, paragraphs, text, audio that has been converted to text, or any other textual content. The encoder encodes the input sentence to generate a sentence vector. In some embodiments, the encoder (or a pre-processor that initially pre-processes the input sentence) can introduce noise in the input sentence to ensure that in trying to reconstruct the input sentence at the output, the model does not merely learn to copy the input sentence. Merely as an example, noise can be introduced by shuffling word order in the input sentence, wherein each word in the input sentence may be shuffled up to a maximum of N locations away from its original location (where N is an integer value such as one, two, three, etc). Thus, the encoder may receive an input sentence (or shuffled input sentence), may introduce noise (e.g., if the input sentence was not already shuffled), parse the input sentence into individual words, generate a vector representation of the words, and output a sentence vector that is a representation of the input sentence.

Between the encoder and decoder of the bidirectional seq2seq neural network is a tone separation module which effectively separates the semantic meaning and tone of the input sentence vector generated by the encoder, according to an embodiment. For example, consider two phrases "guests will see super suit designer Jone Doe" and "guests can hope to meet super suit designer Jone Doe"—these two sentences have similar semantic meaning (i.e., an event where designer Jone Doe will be in attendance), but different tone (i.e., with respect to whether guests "will see" Jone Doe or "can hope to meet" Jone Doe). For example, the first phrase has a first (e.g., medium) degree of politeness as characterized by the bidirectional seq2seq neural (guests "will see" super suit designer Jone Doe), whereas the second sentence has a second (e.g., relatively high) degree of politeness as characterized by the bidirectional seq2seq neural (guests "can hope to meet" super suit designer Jone Doe). Note there may be some overlap in the words or portions that contribute to the semantic meaning and the words or portions that contribute to the tone, although in some example embodiments they are mutually exclusive. Further note that in some cases the tone may be attributable to omitted words (such as the lack of the word "please" yields a less polite tone). In any case, the tone separation module identifies or otherwise separates the semantic meaning part of the sentence vector from the tone part of the sentence vector. For example, from an input sentence vector corresponding to an input sentence, the tone separation module generates a first vector representing the semantic meaning of the input sentence, and generates a second vector representing the tone of the input sentence. Note that the first and second vectors may be concatenated or otherwise part of an overall vector. In any such cases, once separated, the semantic meaning part of the sentence vector is tone-independent, and the tone portion can be readily replaced or modified. Note that the semantic meanings in the above discussed two phrases are the same or otherwise sufficiently similar (e.g., semantic meaning portion conveyed by the two phrases does not differ by more than a threshold value), whereas the tones are different. Further note the original tone may be attributable to the lack of a word and that tone is modified by adding one or more words (such as the addition of the word "please" to change the tone from less polite to more polite), or vice-versa (such as the removal of the word "please" to change the tone from polite to less polite). In such cases, while no words are being replaced with other words, per se, the tone portion is effectively being replaced (e.g., replacing less polite with polite, by adding the word "please"). To this end, replacement of tone does not necessarily require replacement of words; rather, the replacement of tone may be accomplished by simply adding words.

The decoder of the seq2seq framework receives the tone-independent semantic meaning part of the sentence vector from the tone separation module and also receives a target tone, and generates an output sentence having the semantic meaning and the target tone. The target tone can be any desired tone for the output sentence to be generated by the seq2seq framework. Thus, the target tone can have a desired degree of politeness, a desired degree of formality, etc. So, the decoder of the tone modification system receives the semantic meaning part of the input sentence vector, and generates an output sentence that has the semantic meaning part of the sentence vector and the target tone. Thus, the content or semantic meaning of the input sentence and the output sentence remains the same or similar (e.g., within a threshold), whereas the output sentence has the target tone that is different from an original tone of the input sentence. Note that the tone of the output sentence may have, for example, lower degree of formality or politeness than the tone of the input sentence, or vice-versa.

As previously explained, the tone modification system can be trained without the need for burdensome parallel corpora. In some embodiments, a tone assigner (e.g., which may be a tone assignment module in automated tone assigning applications and/or a human in manual tone assigning applications) is used to produce the training data used to train the seq2seq framework of the tone modification system. For example, the tone assigner assigns a tone for a training input sentence that is received by the tone modification system. During such training, the tone separation module separates the tone of the input sentence vector from the semantic meaning of the input sentence vector. Put differently, the tone separation module infers or predicts or otherwise determines a tone of the input sentence, which is the separated tone of the input sentence vector. If the seq2seq framework is fully trained, the assigned tone of the input sentence (e.g., as assigned by the tone assignment module) should ideally match with the predicted tone of the input sentence vector separated by the separation module. In some embodiments, a representation of a difference between these two tones of the input sentence is used to generate a loss function (e.g., which may be referred to as tone prediction loss, or adversarial loss), which is used to train the seq2seq framework. In some embodiments, the training of the seq2seq framework may be performed within the computing device in which the seq2seq framework is finally deployed, and/or may be performed external to the computing device. In one such embodiment, the training of the seq2seq framework is performed in a server, and the trained seq2seq framework is deployed in the computing device.

Another loss function (e.g., also referred to as sequence-to-sequence loss or reconstruction loss) that can be used to train the seq2seq framework of the tone modification system is based on comparison between the input sentence and the output sentence, where the output sentence is generated to have the target tone that is same as the assigned tone (e.g., as assigned by the tone assigner), as will be discussed in turn. Other loss functions, such as maximum entropy, may also be used, as will be discussed in turn.

As will be further appreciated in light of this disclosure, a measure of tone of a sentence is not an absolute measure. For example, if a first user (from a first demographic) and a second user (from a second demographic) views a sentence, the two users may perceive two different tones for the same sentence. Thus, a tone of a sentence is a relative measure, and viewed from the perspective of the tone modification system.

System Architecture

FIG. 1 is a block diagram schematically illustrating selected components of an example computing device 100 (also referred to as device 100) configured to change the tone of one or more sentences, in accordance with some embodiments. As can be seen, the device 100 includes a tone modification system 102 (also referred to as system 102), which is capable of receiving input sentence 130 and a target tone 134, and generate an output sentence 138, where the generated output sentence 138 has similar semantic meaning or content as the input sentence 130. For example, the generated output sentence 138 and the input sentence 130 convey a similar idea or meaning, and/or and any difference between the idea or semantic meaning of the two sentences does not exceed a threshold value. Also, the generated output sentence 138 has the target tone 134. In an example, the target tone 134 is different from an input tone of the input sentence. As variously discussed herein, an "affect" or "tone" of sentences defines a reaction, experience and/or emotion of one or more users, when the users are exposed to the sentences. Measures of tone include a degree of politeness and/or a degree of formality (e.g., whether the sentence is formal or informal, and by what degree), although the measure of tone may include other factors or characteristics, such as a degrees of cheerfulness, slang language used, anger, humor, mood, intensity, verbosity, complexity, and/or the like. For example, in FIG. 1, the target tone 134 comprises a target degree of politeness of the output sentence 138 and/or a target degree of formality of the output sentence 138.

Although FIG. 1 specifically discloses an input sentence 130 and a corresponding output sentence 138, the disclosure is not limited to changing tones of merely sentences. For example, the tone modification system 102 can change the tone of one or more phrases, one or more paragraphs, sections of text, audio, and/or or any appropriate digital content. Thus, although some embodiments and examples herein are discussed with respect to changing a tone of a sentence, this does not limit the scope of the disclosure, and the principles of this disclosure can be applied to change the tone of phrases, paragraphs, text, audio, digital content, etc. In FIG. 1, the input sentence 130 can be input to the system 102 in the form of text, audio, etc. Similarly, the output sentence 138 can be output in the form of text, audio, etc.

As will be appreciated, the configuration of the device 100 may vary from one embodiment to the next. To this end, the discussion herein will focus more on aspects of the device 100 that are related to facilitating modification of tone, and less so on standard componentry and functionality typical of computing devices.

The device 100 can comprise, for example, a desktop computer, a laptop computer, a workstation, an enterprise class server computer, a handheld computer, a tablet computer, a smartphone, a set-top box, a game controller, and/or any other computing device that can display sentences and allow to change a tone of the sentences.

In the illustrated embodiment, the device 100 includes one or more software modules configured to implement certain functionalities disclosed herein, as well as hardware configured to enable such implementation. These hardware and software components may include, among other things, a processor 142, memory 144, an operating system 146, input/output (I/O) components 148, a communication adaptor 140, data storage module 114, and the tone modification system 102. A bus and/or interconnect 150 is also provided to allow for inter- and intra-device communications using, for example, communication adaptor 140. Note that in an example, components like the operating system 146 and the tone modification system 102 can be software modules that are stored in memory 144 and executable by the processor 142. In an example, at least sections of the tone modification system 102 can be implemented at least in part by hardware, such as by Application-Specific Integrated Circuit (ASIC). The bus and/or interconnect 150 is symbolic of all standard and proprietary technologies that allow interaction of the various functional components shown within the device 100, whether that interaction actually take place over a physical bus structure or via software calls, request/response constructs, or any other such inter and intra component interface technologies.

Processor 142 can be implemented using any suitable processor, and may include one or more coprocessors or controllers, such as an audio processor or a graphics processing unit, to assist in processing operations of the device 100. Likewise, memory 144 can be implemented using any suitable type of digital storage, such as one or more of a disk drive, solid state drive, a universal serial bus (USB) drive, flash memory, random access memory (RAM), or any suitable combination of the foregoing. Operating system 146 may comprise any suitable operating system, such as Google Android, Microsoft Windows, or Apple OS X. As will be appreciated in light of this disclosure, the techniques provided herein can be implemented without regard to the particular operating system provided in conjunction with device 100, and therefore may also be implemented using any suitable existing or subsequently-developed platform. Communication adaptor 140 can be implemented using any appropriate network chip or chipset which allows for wired or wireless connection to a network and/or other computing devices and/or resource. The device 100 also include one or more I/O components 148, such as one or more of a tactile keyboard, a display, a mouse, a touch sensitive display, a touch-screen display, a trackpad, a microphone, a camera, scanner, and location services. In general, other componentry and functionality not reflected in the schematic block diagram of FIG. 1 will be readily apparent in light of this disclosure, and it will be appreciated that the present disclosure is not intended to be limited to any specific hardware configuration. Thus, other configurations and subcomponents can be used in other embodiments.

Figure 2:
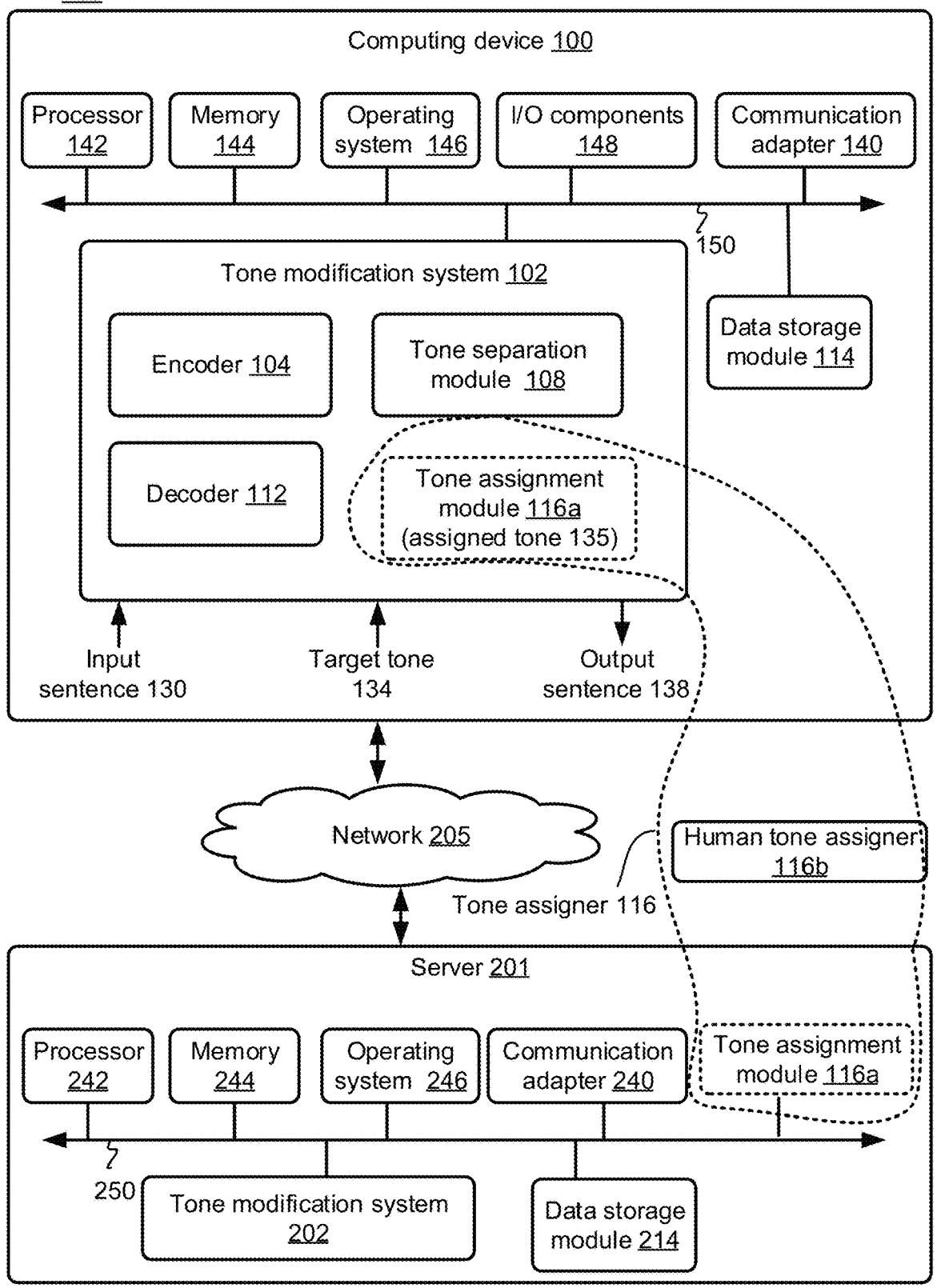
FIG. 2 is a block diagram schematically illustrating selected components of an example system comprising the computing device of FIG. 1 communicating with server device(s), where the combination of the device and the server device(s) are configured to change the tone of one or more sentences, in accordance with some embodiments.

Also illustrated in FIG. 1 is the tone modification system 102 implemented on the device 100. In an example embodiment, the system 102 includes an encoder module 104, a tone separation module 108, a decoder module 112, and a tone assignment module 116a. Although in an example embodiment, the tone assignment module 116a is included in the tone modification system 102, in another example embodiment, the tone assignment module 116a may be at least in part external to the system 102 and/or be implemented external to the device 100, as will be discussed in turn. For example, in an example, the training of the seq2seq framework is performed in a server separate from the device 100, and the trained seq2seq framework is deployed in the device 100 after the training—in such an example, the tone assignment module 116a is in the server (e.g., as illustrated in FIG. 2). Hence, the tone assignment module 116a is illustrated using dotted line in various figures.

In an example, the tone assignment module 116a can be at least partially or fully replaced, or complemented, by a human tone assigner 116b. For example, a human can receive input training sentences and manually assign tones 135 to the input training sentences. As can be seen in the example case illustrated in FIG. 1, the tone assignment module 116a and the human tone assigner 116b are referred to herein as tone assigner 116. Other embodiments may include one or the other.

In an example, the components of the system 102 are in communication with one another or other components of the device 100 using the bus and/or interconnect 150, as previously discussed. The components of the system 102 can be in communication with one or more other devices including other computing devices of a user, server devices (e.g., cloud storage devices), licensing servers, or other devices/systems. Although the components of the system 102 are shown separately in FIG. 1, any of the subcomponents may be combined into fewer components, such as into a single component, or divided into more components as may serve a particular implementation.

In an example, the components of the system 102 performing the functions discussed herein with respect to the system 102 may be implemented as part of a stand-alone application, as a module of an application, as a plug-in for applications, as a library function or functions that may be called by other applications, and/or as a cloud-computing model. Thus, the components of the system 102 may be implemented as part of a stand-alone application on a personal computing device or a mobile device. Alternatively, or additionally, the components of the tone modification system 102 may be implemented in any application that allows tone modification of digital content, including, but not limited to, ADOBE® EXPERIENCE MANAGER®, ADOBE® CAMPAIGN®, ADOBE® ACROBAT®, ADOBE® SENSEI®, ADOBE® SOCIAL®, and/or ADOBE® READER®. "ADOBE EXPERIENCE MANAGER," "ADOBE CAMPAIGN," "ADOBE ACROBAT," "ADOBE SENSEI," "ADOBE SOCIAL," "ADOBE READER" and "ADOBE" are registered trademarks of Adobe Inc. in the United States and/or other countries.

In some embodiments, one or more components of the system 102 are implemented using machine learning models. For example, the input sentence 130, the tone attributes of which are to be modified to generate the output sentence 138, is modeled using a bidirectional sequence-to-sequence (seq2seq) framework with attention. The seq2seq framework relies on encoder-decoder paradigm. The encoder 104 encodes the input sequence 130, while the decoder 112 generates the output sentence 138. Attention is a mechanism in the seq2seq framework that forces the model to learn to focus (e.g., to attend) on specific parts of the input sequence when decoding, instead of relying only or merely on the hidden vector of the decoder's Long short-term memory (LSTM).

As discussed, the system 102 receives the input sentence 130, which is encoded by the encoder 104 of the seq2seq framework. For example, as will be discussed in turn, the encoder 104 receives the input sentence 130, parses the input sentence 130 into individual words, generates a vector representation of the words, and outputs a sentence vector that is a representation of the input sentence 130. In some embodiments, if the input sentence 130 includes multiple sentences or phrases, one or more corresponding sentence vectors are generated, such that each sentence vector is a representation of one or more corresponding phrases or sentences. In some embodiments, noise can be introduced in the encoding phase (e.g., by shuffling word order in a sentence), e.g., to ensure that in trying to reconstruct the input sentence, the model does not merely learn to copy the input sentence.

As will be discussed in further detail herein in turn, the tone separation module 108 (also referred to as separation module 108, or simply as module 108) separates the tone-independent semantic meaning (i.e., content or idea conveyed by the sentence) from tone in the sentence vector generated by the encoder 104. For example, consider two phrases "guests will see super suit designer Jone Doe" and "guests can hope to meet super suit designer Jone Doe"—these two sentences have similar semantic meaning, but different tone. For example, the first phrase has a first (e.g., medium) degree of politeness, whereas the second sentence has a second (e.g., relatively high) degree of politeness. The separation module 108 separates the semantic meaning part of the sentence vector from the tone part of the sentence vector. Thus, once separated, the semantic meaning part of the sentence vector is tone-independent. For the above discussed two phrases, the semantic meaning is the same, whereas the tone is different.

The decoder 112 receives the semantic meaning part of the sentence vector from the separation module 108 and also receives the target tone 134. The decoder 112 reconstructs the output sentence 138 such that the output sentence 138 has the semantic meaning part of the sentence vector and the target tone 134. Thus, the semantic meaning of the input sentence 130 and the output sentence 138 are same or similar (e.g., difference in semantic meaning of the two sentences, if any, is within a threshold), whereas the tone of the output sentence 138 is the target tone 134 that is different from a tone of the input sentence.

The tone assigner 116 is used to generate training data that can be used to train the seq2seq framework comprising the encoder 104, the decoder 112, and the separation module 108. For example, the tone assigner 116 determines and assigns the tone 135 associated with the input sentence 130 (e.g., when the input sentence 130 is a part of the training data). Also, the separation module 108 separates the tone of the input sentence 130 from the semantic meaning of the input sentence 130. That is, the separation module 108 predicts the tone of the input sentence, by separating the tone from the sentence vector. If the seq2seq framework is fully trained, the assigned tone 135 of the input sentence 130 (e.g., as output by the tone assigner 116) should ideally match with the predicted tone of the input sentence 130 separated by the separation module 108. In some embodiments, a representation of a difference between these two tones of the input sentence 130 is used to generate a loss function (e.g., which may be referred to as tone prediction loss), which is used to train the seq2seq framework (e.g., used to train the separation module 108). The tone prediction loss is a measure of effectiveness of operation of the separation module 108, e.g., how successful is the separation module 108 in separating and predicting the tone of the input sentence 130.

Another loss function (e.g., also referred to as sequence-to-sequence loss or reconstruction loss) that can be used to train the seq2seq framework is based on any difference between the input sentence 130 and the output sentence 138, where the output sentence is constructed by the decoder 112 to have the same target tone as the assigned tone, e.g., as assigned by the tone assigner 116. Put differently, given an input sentence having a specific assigned tone, the decoder generates an output sentence having the specific assigned tone. Because the tones of the input and output sentences are the same, if the seq2seq framework is fully trained and works as intended, the input and output sentences should ideally be same or similar. That is, the decoder should ideally be able to reconstruct the output sentence to match the input sentence. Thus, a comparison of the input and output sentences is used to generate the reconstruction loss function, which is used to train the seq2seq framework, as will be discussed in turn. Other loss functions, such as maximum entropy, may also be used, as will be discussed in turn.

As discussed herein previously, the tone assigner 116 is used to generate training data that can be used to train the seq2seq framework comprising the encoder 104, the decoder 112, and the separation module 108. As discussed, in an example, the tone assigner 116 can be tone assignment module 116a that assigns a tone 135 (e.g., also referred to as "assigned tone 135"), e.g., which is a representation of politeness and/or a degree of formality of the input sentence 130. For example, the tone assignment module 116a can be a machine learning module that receives the input sentence, determines the tone 135, and assigns the tone 135. In another example, the tone assigner 116 can be a human tone assigner 116b who receives the input sentence 130, determines the tone 135, and assigns the tone 135 to the input sentence 130. In either case, a degree of politeness and/or a degree of formality is assigned to the input sentence 130, according to some such embodiments.

Thus, the seq2seq framework of the system 102 is trained using training data comprising a sequence of input sentences and a corresponding sequence of assigned tones. For example, the training data used to train the system 102 includes a first input sentence and a first assigned tone, a second input sentence and a second assigned tone, and so on. That is, the training data used to train the system 102 includes a corpus of non-parallel pairs, each pair comprising an input sentence and a corresponding assigned tone. This is considered to be non-parallel corpora. That is, the training data lacks, for an input sentence, a corresponding output sentence having a target tone—rather, the training data includes input sentences, and a corresponding assigned tone for each of the input sentence. For example, parallel corpora may include a pair of an input sentence and a corresponding output sentence having a target tone. However, such a large set of input/output sentence pairs, along with tones of each of the input and output sentences, may not be readily available for training the system 102. Accordingly, non-parallel corpora comprising multiple pairs of (input sentence, corresponding assigned tone) are used to train the system 102, where the tone assigner 116 provides a corresponding assigned tone 135 for a corresponding input sentence 130.

FIG. 2 is a block diagram schematically illustrating selected components of an example system 200 comprising the computing device 100 of FIG. 1 communicating with server device(s) 201, where the combination of the device 100 and the server device(s) 201 (henceforth also referred to generally as server 201) are configured to change the tone of one or more sentences, in accordance with some embodiments.

In an example, the communication adaptor 140 of the device 100 can be implemented using any appropriate network chip or chipset allowing for wired or wireless connection to network 205 and/or other computing devices and/or resources. To this end, the device 100 is coupled to the network 205 via the adaptor 140 to allow for communications with other computing devices and resources, such as the server 201. The network 205 is any suitable network over which the computing devices communicate. For example, network 205 may be a local area network (such as a home-based or office network), a wide area network (such as the Internet), or a combination of such networks, whether public, private, or both. In some cases, access to resources on a given network or computing system may require credentials such as usernames, passwords, or any other suitable security mechanism.

In one embodiment, the server 201 comprises one or more enterprise class devices configured to provide a range of services invoked to provide tone modification services, as variously described herein. Examples of such services include receiving from the device 100 input comprising the input sentence 130 and the target tone 134, generating the output sentence 138 (e.g., which has similar semantic meaning as the input sentence 130, and which has the target tone 134), and transmitting the output sentence 138 to the device 100 for displaying on the device 100, as explained below. Although one server 201 implementation a tone modification system 202 is illustrated in FIG. 2, it will be appreciated that, in general, tens, hundreds, thousands, or more such servers can be used to manage an even larger number of tone modification functions.

In the illustrated embodiment, the server 201 includes one or more software modules configured to implement certain of the functionalities disclosed herein, as well as hardware configured to enable such implementation. These hardware and software components may include, among other things, a processor 242, memory 244, an operating system 246, a tone modification system 202 (also referred to as system 202), data storage module 214, and a communication adaptor 240. A bus and/or interconnect 250 is also provided to allow for inter- and intra-device communications using, for example, communication adaptor 240 and/or network 205. Note that components like the operating system 246 and tone modification system 202 can be software modules that are stored in memory 244 and executable by the processor 242. The previous relevant discussion with respect to the symbolic nature of bus and/or interconnect 150 is equally applicable here to bus and/or interconnect 250, as will be appreciated.

Processor 242 is implemented using any suitable processor, and may include one or more coprocessors or controllers, such as an audio processor or a graphics processing unit, to assist in processing operations of the server 201. Likewise, memory 244 can be implemented using any suitable type of digital storage, such as one or more of a disk drive, a universal serial bus (USB) drive, flash memory, random access memory (RAM), or any suitable combination of the foregoing. Operating system 246 may comprise any suitable operating system, and the particular operating system used is not particularly relevant, as previously noted. Communication adaptor 240 can be implemented using any appropriate network chip or chipset which allows for wired or wireless connection to network 205 and/or other computing devices and/or resources. The server 201 is coupled to the network 205 to allow for communications with other computing devices and resources, such as the device 100. In general, other componentry and functionality not reflected in the schematic block diagram of FIG. 2 will be readily apparent in light of this disclosure, and it will be further appreciated that the present disclosure is not intended to be limited to any specific hardware configuration. In short, any suitable hardware configurations can be used.

The server 201 can generate, store, receive, and transmit any type of data, including digital content such as sentences, phrases, texts, etc., e.g., for which the tone is to be modified. As shown, the server 201 includes the tone modification system 202 that communicates with the system 102 on the client device 100. In an example, the tone modification features discussed with respect to FIG. 1 can be implemented in FIG. 2 exclusively by the tone modification system 102, exclusively by the tone modification system 202, and/or may be shared between the tone modification systems 102 and 202. Thus, in an example, none, some, or all tone modification features are implemented by the tone modification system 202.

For example, when located in the server 201, the tone modification system 202 comprise an application running on the server 201 or a portion of a software application that can be downloaded to the device 100. For instance, the system 102 can include a web hosting application allowing the device 100 to interact with content from the tone modification system 202 hosted on the server 201. In this manner, the server 201 modifies tone of sentences based on the digital content and user interaction within a graphical user interface provided to the device 100.

In an example, the tone assignment module 116a can be implemented in the device 100 and/or the server 201, and hence, instances of the tone assignment module 116a are illustrated in dotted lines in FIG. 2. For example, the training of the tone modification system 102 can be performed in the server 201, and in such an example, the tone assignment module 116a can be implemented in the server 201, or even in a different server (not illustrated)—after the training is complete, the trained tone modification system 102 can be stored in the device 100. In another example, the training (or re-training) of the tone modification system 102 can be performed in the device 100.

Thus, the location of some functional modules in the system 200 may vary from one embodiment to the next. For instance, while encoder 104 can be on the client side in some example embodiments, it may be on the server side (e.g., within the tone modification system 202) in other embodiments. Any number of client-server configurations will be apparent in light of this disclosure. In still other embodiments, the techniques may be implemented entirely on a user computer, e.g., simply as stand-alone tone modification application.

Figure 3:
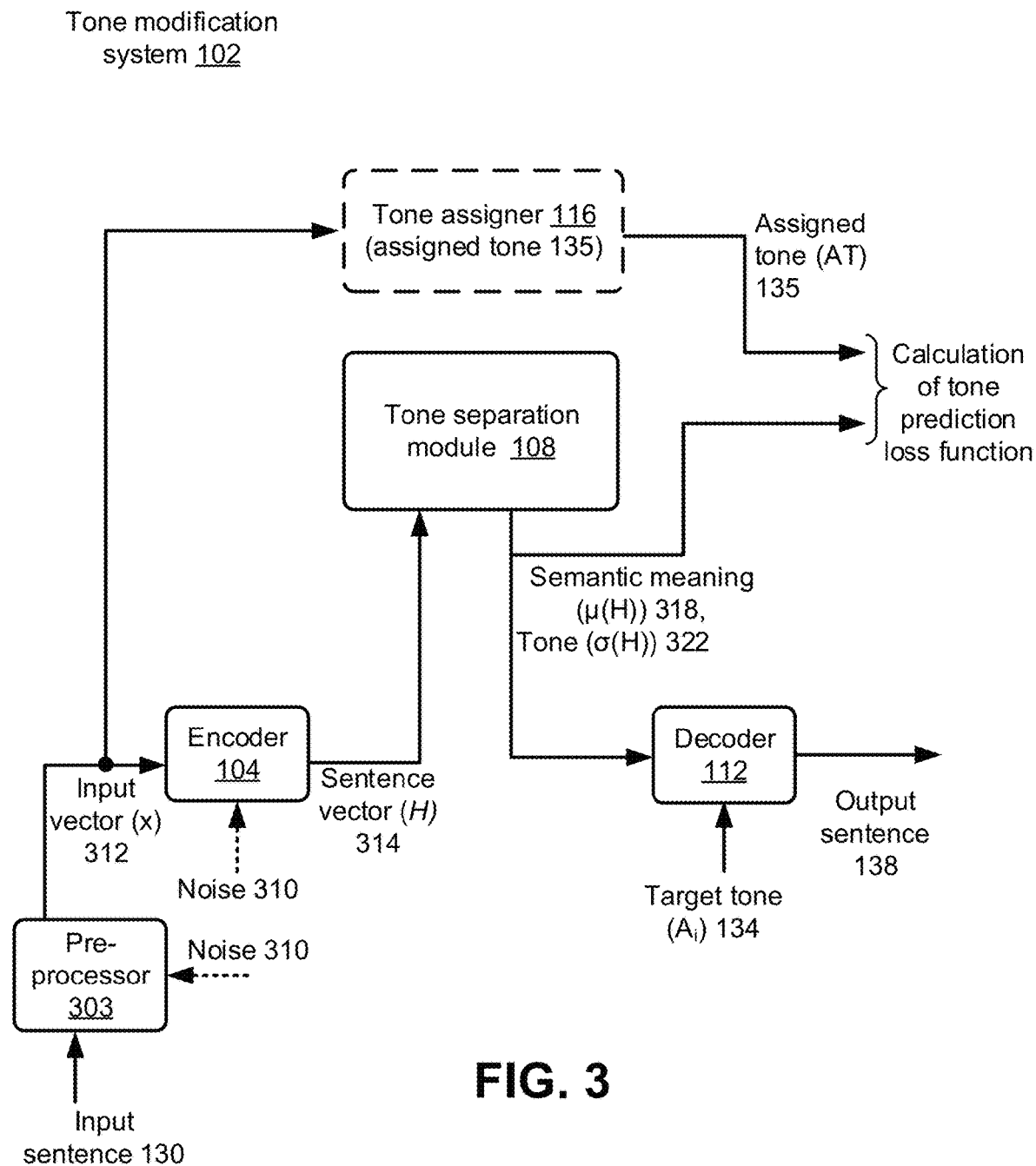
FIG. 3 is a block diagram schematically illustrating a tone modification system, which is configured to change the tone of one or more sentences, in accordance with some embodiments.

FIG. 3 is a block diagram schematically illustrating the tone modification system 102 of FIGS. 1 and 2, which is configured to change the tone of one or more sentences, in accordance with some embodiments. In some embodiments, the tone modification system 102 comprises a pre-processor 303, although the pre-processor 303 is not illustrated in FIGS. 1 and 2. In an example, the pre-processor 303 can be combined with the encoder 104. In some embodiments, the pre-processor 303 receives the input sentence 130. As previously discussed herein, although FIG. 3 specifically discloses an input sentence 130 and a corresponding output sentence 138, the disclosure is not limited to changing tones of sentences. For example, the tone modification system 102 can change the tone of phrases, paragraphs, sections of text, audio, and/or any appropriate digital content. The input sentence 130 can be in the form of text, audio, etc.

In some embodiments, the pre-processor 303 pre-processes the input sentence 130 into a format that can be encoded by the encoder 104. For example, the pre-processor 303 converts the sentence 130 into lowercase and splits into words (e.g., tokenizes the words of the input sentences 130). The pre-processor 303 generates a vocabulary of individual words of the input sentence 130, and generates a map between individual words and corresponding integer identifiers, and outputs the individual words along with the integer identifiers, in an example. In another example, the pre-processor 303 pre-processes the input sentence 130, and outputs the sentence 130 to the encoder 104 in a format that is readily understandable to the encoder 104.

In some embodiments, noise 310 may be introduced in the input sentence 130. In an example, the introduction of the noise 310 is optional, and hence, in some other embodiments, the noise 310 is not introduced in the input sentence. The noise 310 can be introduced at the pre-processor 303 and/or at the encoder 104 (hence, noise 310 is illustrated using dotted lines). Noise 310 is added to the input sentence 130 by, for example, shuffling the word order in the input sentence 130. This is to ensure, for example, that in trying to reconstruct the input sentence later at the decoder 112, the seq2seq model framework of the tone modification system 102 does not merely learn to copy the input. Merely as an example, each word in the input sentence 130 is shuffled up to a maximum of N words away from its original location, where N is an integer and may be one, two, three, or higher.

In some embodiments, the encoder 104 is a Gated Recurrent Unit (GRU) based encoder. In an example, GRU aims to solve the vanishing gradient problem which comes with a standard recurrent neural network. The GRU is a gating mechanism in recurrent neural network. GRU can be considered as a variation of the long short-term memory (LSTM), e.g., because both GRU and LSTM are designed somewhat similarly. GRU is like the LSTM with forget gate, but has fewer parameters than LSTM, as the GRU lacks an output gate. A GRU, instead of having a simple neural network with four nodes (e.g., as the RNN had previously), has a cell containing multiple operations. The model in a GRU that is being repeated in every sequence contains one or more (e.g., three) models, where each one of those can be a neural network. GRU uses the so-called update gate and reset gate. A Sigma notation in a GRU represent such gates, which allows a GRU to carry forward information over many time periods in order to influence a future time period. In other words, a value is stored in memory for a certain amount of time and at a critical point pulling that value out and using it with the current state to update at a future date. There are several variations on a full gated unit of a GRU, with gating done using the previous hidden state and the bias in various combinations, and a simplified form called minimal gated unit.

In an example, the encoder 104 comprising the GRU unit includes the following components:

$$s_j = z_j \odot h_j + (1-z_j) \odot s_{j-1},$$

$$h_j = \tanh(WE[x_{j-1}] + r_j \odot (Us_{j-1})),$$

$$r_j = \sigma(W_r E[x_{j-1}] + U_r s_{j-1}),$$

$$z_j = \sigma(W_z E[x_{j-1}] + U_z s_{j-1}),$$  Equations 1 where the operator $\odot$ denotes the Hadamard product, $\sigma$ is the sigmoid function, $x_j$ is an input vector comprising the words of the input sentence 130 (e.g., after being processed by the pre-processor 303 and/or after the noise 310 is added), $s_j$ is the output vector, $h_j$ is an internal state, $z_j$ is the update gate vector, $r_j$ is the reset gate vector, W, E and U are parameter matrices.

Thus, in the encoder 104, the input words x are embedded into the input vector $x_j$ and fed into the encoder 104. The final state outputted by the encoder 104 is a sentence vector H, where:

$$H_i = E(x_i, \Theta e).$$  Equation 2

In equation 2, $x_i$ is an $i^{th}$ vector for an $i^{th}$ input sentence 130, $H_i$ is the $i^{th}$ sentence vector generated corresponding to the $i^{th}$ input sentence 130, E( . . . ) denotes the function performed by the encoder 104, and $\Theta e$ represents the parameters of the encoder 104 (such as weights, bias, word embeddings, etc.). The input vector x is labelled using label 312 in FIG. 3, and the sentence vector H is labelled using label 314 in FIG. 3. Thus, FIG. 3 illustrates the encoder 104 receiving an input vector x 312, and generating a corresponding sentence vector H 314. In an example, the sentence vector H preserves the semantic meaning and tone of the input vector x. That is, the semantic meaning and tone of the input sentence 130 is present in the sentence vector H 314.

In some embodiments, the tone separation module 108 (also referred to as separation module 108) receives the sentence vector H 314, and separates the tone-independent semantic meaning from the tone of the sentence vector H 314. For example, the separation module 108 generates semantic meaning $\mu(H)$ 318 and tone $\sigma(H)$ 322. Thus, a section of the sentence vector H314, that conveys the tone-independent semantic meaning of the input sentence, is identified. Similarly, a section of the sentence vector H314, that conveys the tone of the input sentence, is identified. It is to be noted that each of the semantic meaning $\mu(H)$ 318 and tone $\sigma(H)$ 322 are in vector form.

The semantic meaning $\mu(H)$ 318 represents the semantic meaning of the sentence vector H 314, and hence, the semantic meaning of the input sentence 130. The tone $\sigma(H)$ 322 represents the tone of the sentence vector H 314, and hence, the tone of the input sentence 130. The tone $\sigma(H)$ 322 is also referred to as an "input tone" or "original tone" of the input sentence 130, and also referred to as "predicted tone," as predicted by the tone separation module 108. In some embodiments, the quality of prediction or separation of the tone by the tone separation module 108 is improved by training the tone separation module 108 using one or more loss functions, such as a tone prediction loss function, as will be discussed herein in turn.

In some embodiments, the separation module 108 models the tone (e.g., politeness, level of formality, etc.) of each input sentence using a probabilistic distribution derived from a mixture density network (MDN). The separation module 108 acts as an adversary to the seq2seq model framework, and ensures that the hidden representation learned by the seq2seq model framework (e.g., the semantic meaning $\mu(H)$ 318) does not contain any information about the tone from the original sentence, i.e., is tone-independent.

In some embodiments, the separation module 108 is modeled as a multi-layer fully connected feed forward network (e.g., with rectified linear unit (ReLU) activations). The ReLU acts as an activation function for the network. In an example, as the separation module 108 acts as an adversary to the seq2seq model framework, the parameters of the separation module 108 are denoted by $\Theta adv$, where the phrase "adv" represents "adversary." In an example, the separation module 108 models distributions using a mixture of multivariate gaussians. In another example, as a single tone dimension is modeled at a time (e.g., politeness, formality, etc., one at a time), the separation module 108 can model single univariate gaussian. In another example, multivariate gaussians are used to model multiple dimensions of tone simultaneously (e.g., simultaneously model politeness, formality and/or other tone dimensions).

In some embodiments, the semantic meaning $\mu(H)$ 318 and tone $\sigma(H)$ 322 separated by the separation module 108 are received by the decoder 112. In some other embodiments, the semantic meaning $\mu(H)$ 318 is received by the decoder 112 (i.e., in such embodiments, the tone $\sigma(H)$ 322 is not received by the decoder 112)). The decoder also receives the target tone ($A_i$) 134. An $i^{th}$ target tone for the $i^{th}$ input sentence 130 is denoted by $A_i$.

In some embodiments, the decoder 112 has at least in part a similar structure as the encoder 104. For example, similar to the encoder 104, the decoder 112 comprises a GRU. In an example, the decoder 112 has an additional attention layer at its output. Attention is a mechanism in the seq2seq framework that forces the model to learn to focus (e.g., to attend) on specific parts of the input sequence when decoding, instead of relying only or merely on the hidden vector of the decoder's Long short-term memory (LSTM).

In an example, the decoder 112 receives (or generates) a concatenated input vector $HC_i$ comprising a concatenation of the sentence vector $H_i$ 314 with the target tone $A_i$ 134. In another example, the decoder 112 receives a concatenated input vector $HC_i$, which is a concatenation of the semantic meaning $\mu(H)$ 318 with the target tone $A_i$ 134. That is, the decoder 112 receives at least the semantic meaning $\mu(H)$ 318 and the target tone $A_i$ 134 of the output sentence 138. In yet another example, the decoder 112 has a concatenated input vector $HC_i$, which is a concatenation of the semantic meaning $\mu(H)$ 318 and the tone $\sigma(H)$ 322, and the target tone $A_i$ 134 is separately input to the decoder 112. The concatenated input vector $HC_i$ forms the input to the decoder 112.

The concatenated vector $HC_i$ is fed through a single feedforward layer to make the dimensions of the decoder 112 compatible with those of the encoder 104. In an example, making the dimensions compatible allows use of Luong (e.g., dot product) based attention. In an example, a decoder loss is a function that minimizes a reconstruction error between the input sentence 130 (e.g., prior to adding the noise 310) and the reconstructed output sentence 138.

In some embodiments, the attention based GRU model used for the decoder is as follows:

$$P(y_i) = \Pi P(y_{i,j}|y_{i,s<j})$$

$$\widehat{h_{i,t}} = \tanh(W_c[c_t;h_t])$$

$$P(y_{i,t}|y_{i,s<j}) = \text{softmax}(W_s \widehat{h_{i,t}})$$

$$h_{i,t} = f(h_{i,j-1}, \Theta d)$$

$$h_{i,0} = F([HC_i; A_i]), \quad \text{Equations 3}$$

where $y_i$ represents the output sentence 138, the function $f$ is the recurrent function for GRUs of the decoder 112, $h_i$ and $k$ are internal hidden states, $c_t$ is a source side context vector using a Global Attention formulation, $\Theta d$ are parameters of the GRU decoder, concatenated input vector $HC_i$ discussed herein previously forms the input to the decoder 112, and $A_i$ is the target tone. The $h_{i,0}$ is an initial hidden state of the decoder 112, computed using the function F, which is a single fully connected layer that combines the final encoder state with the tone value. The collection of attention parameters is denoted as $\Theta at$. In an example, the decoder 112 is trained using teacher-forcing, and has a separate embedding layer for this purpose.

Thus, the decoder 112 learns to reconstruct the input sentence 130 using a tone-independent representation (e.g., using the semantic meaning $\mu(H)$ 318) and additional tone information (i.e., target tone $A_i$ 134). In order to generate the output sentence 138 with the same semantic meaning but with different target tone, the original tone of the input sentence 130 is replaced with the target tone $A_i$ 134. Thus, the generated output sentence 138 has the same semantic meaning as the input sentence 130, but with a user supplied target tone $A_i$ 134.

In some embodiments, the tone assigner 116 is used to produce the non-parallel training data used to train the seq2seq framework comprising the encoder 104, the decoder 112, and the separation module 108. The tone assigner 116 is included in the system 102 in an example, and is external to the system 102 in another example, as discussed herein previously. The tone assigner 116 receives the input sentence 130, and predicts and assigns a tone (referred to as "assigned tone") to the input sentence 130. The tone assigner 116 can be used to generate tone values for a large corpora of training sentences, which in turn can be used to train the system 102.

The tone assigner 116 can be any module that generates the assigned tone 135, which is a degree of politeness and/or a degree of formality of the input sentence 130, according to an embodiment. As previously explained, the tone assigner 116 can be a machine learning model trained to predict or otherwise determine a tone of a sentence, and assign that tone to the sentence, such as the tone assignment module 116a. In another example, the tone assigner 116 canced be a human tone assigner 116b who receives the input sentence 130, and determines and assigns the tone 135 to the input sentence 130. Note that the assigned tone 135 generated by the tone assigner 116 for the input sentence 130 is also referred to in FIG. 3 as AT 135.

Thus, the tone assigner 116 generates the assigned tone AT 135 of the input sentence 130. Also, the separation module 108 separates and predicts the tone $\sigma(H)$ 322 of the input sentence 130 from the semantic meaning $\mu(H)$ 318 of the input sentence 130. If the seq2seq framework is fully or otherwise sufficiently trained, the assigned tone AT 135 of the input sentence 130 should ideally match (within a given threshold) with the predicted tone $\sigma(H)$ 322 output by the separation module 108. In some embodiments, a representation of a difference between these two tones of the input sentence 130 is used to generate a loss function (e.g., which may be referred to as tone prediction loss), which is used to train the seq2seq framework. In some embodiments, the separation module 108 learns the tone from the sentence vector $H_i$ by maximizing a log likelihood of predicting the tone from the gaussian distribution parametrized by $\mu(xi)$ and $\sigma(xi)$, where xi is the input words of the sentence 130. The tone prediction loss (Ltp) is generated by:

$$L_{tp} = -\Sigma \log(P((AT)|\mu(H_i), \sigma(H_i))) \quad \text{Equation 4}$$

In equation 4, AT is the assigned tone 135 output by the tone assigner 116 for the input sentence 130, and $\sigma(H)$ and $\mu(H)$ are the tone and semantic meaning, respectively, separated by the separation module 116 for the input sentence 130.

In some embodiments, the tone prediction loss Ltp is backpropagated to parameters $\Theta adv$ of the separation module 108. In some embodiments, the tone prediction loss Ltp is backpropagated only to parameters $\Theta adv$ of the separation module 108, and not to parameters of the encoder 104 and/or the decoder 112.

In some embodiments, an overall training loss is a combination of sequence to sequence generation loss $L_{seq2seq}$, tone prediction loss $L_{tp}$, and/or entropy maximization loss. The sequence to sequence generation loss $L_{seq2seq}$ is also referred to as a reconstruction loss, as this loss represents loss in reconstructing the semantic meaning of the input sentence 130 in the output sentence 138. The sequence to sequence generation loss $L_{seq2seq}$ is given by:

$$L_{seq2seq}(\Theta_d, \Theta_e, \Theta_{at}) = -\Sigma \log(P(y_i|x_i, (\Theta_d, \Theta_e, \Theta_{at}))), \quad \text{Equation 5}$$

where $\Theta_d$, $\Theta_e$, $\Theta_{at}$ are respectively the parameters of the decoder 112, encoder 108, and the attention parameter of the attention layer associated with the decoder 112. Thus, the sequence to sequence generation loss $L_{seq2seq}$ is based on cross entropy between words of the output sentence and words of the input sentence. During training, the seq2seq model aims to maximize the cross entropy between words of the output sentence and words of the input sentence (e.g., minimize the sequence to sequence generation loss $L_{seq2seq}$).

For example, the sequence-to-sequence loss or reconstruction loss of equation 5 is based on an input sentence 130 (xi of equation 5) and an output sentence 138 (yi of equation 5), where the output sentence is reconstructed by the decoder 112 to have the same target tone as the assigned tone, e.g., as assigned by the tone assignment module. Put differently, given an input sentence having a specific assigned tone (e.g., as assigned by the tone assigner 116), the decoder 112 generates an output sentence having the same specific assigned tone. Because the tones of the input and output sentences are now the same (and the semantic meaning of the two sentences are also same or similar), if the seq2seq framework is fully trained and works as intended, the input and output sentences should also be same or similar. Thus, a comparison of the input and output sentences are used to generate the loss $L_{seq2seq}$, which is used to train the seq2seq framework.

In some embodiments, the seq2seq model of the system 102 is trained to generate output sentences, and a loss function is generated in an attempt to "fool" the adversary, where the adversary is the separation module 108. In such embodiments, the loss function is to minimize the predictability of tone from the encoded representation. To enable this, two alternative approaches are proposed below.

In a first approach, an entropy loss function is generated as:

$$L_{ent} = -L_{tp}.$$  Equation 6

However, in some embodiments, equation 6 may not necessarily lead to a stable objective. Accordingly, in some embodiments, a maximum entropy loss objective can be formulated as:

$$L_{ent} = -\Sigma E(P(A_i | \mu(H_i), \sigma(H_i), \Theta_{adv}, \Theta_e)$$  Equation 7

In some embodiments, a total loss function is a weighted sum of the above discussed three losses:

$$L_{total} = L_{seq2seq} + w_{tp}*L_{tp} + w_{ent}*L_{ent}$$  Equation 8 where $w_{tp}$ and $w_{ent}$ are weighting coefficients for the tone prediction loss $L_{tp}$ and the entropy loss $L_{ent}$, respectively.

In some embodiments, the system 102 may be trained using the above discussed loss functions of equations 4-8. The weights $w_{tp}$ and/or $w_{ent}$ are appropriately configured while training the system 102. For example, the training may be carried out in batches, with one batch being trained to maximize loss function associated with entropy of adversary ($L_{ent}$) and minimize the reconstruction loss ($L_{seq2seq}$), while the next batch is used to train the adversary (i.e., the separation module 108) to predict the tone (e.g., reduce ($L_{tp}$)). In an example, the training is performed using Adam adaptive learning rate optimization algorithm.

Figure 4A:
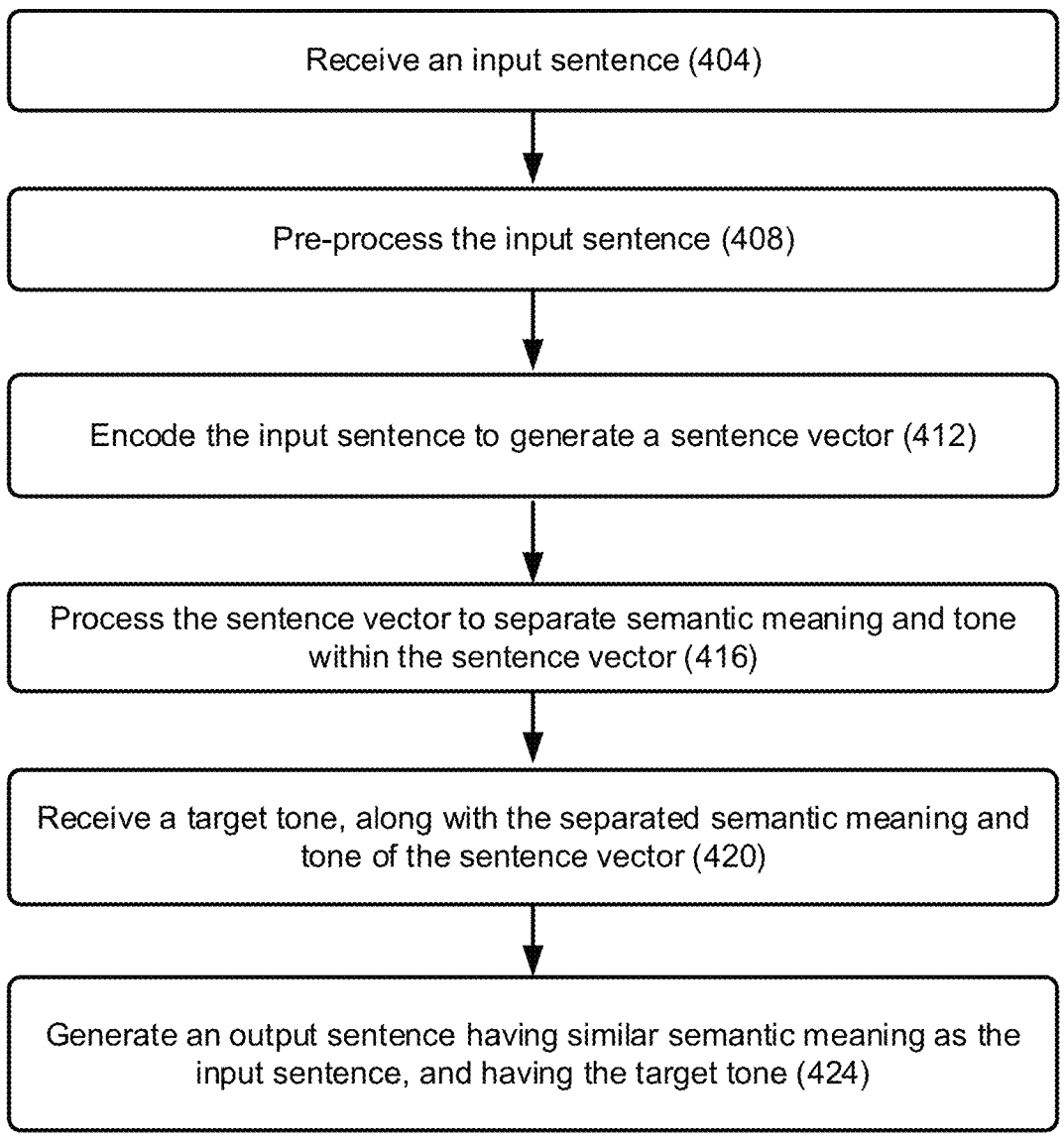
FIG. 4A is a flowchart illustrating an example method for modifying the tone of a sentence, without modifying a meaning or content of the sentence, in accordance with some embodiments.
Figure 4B:
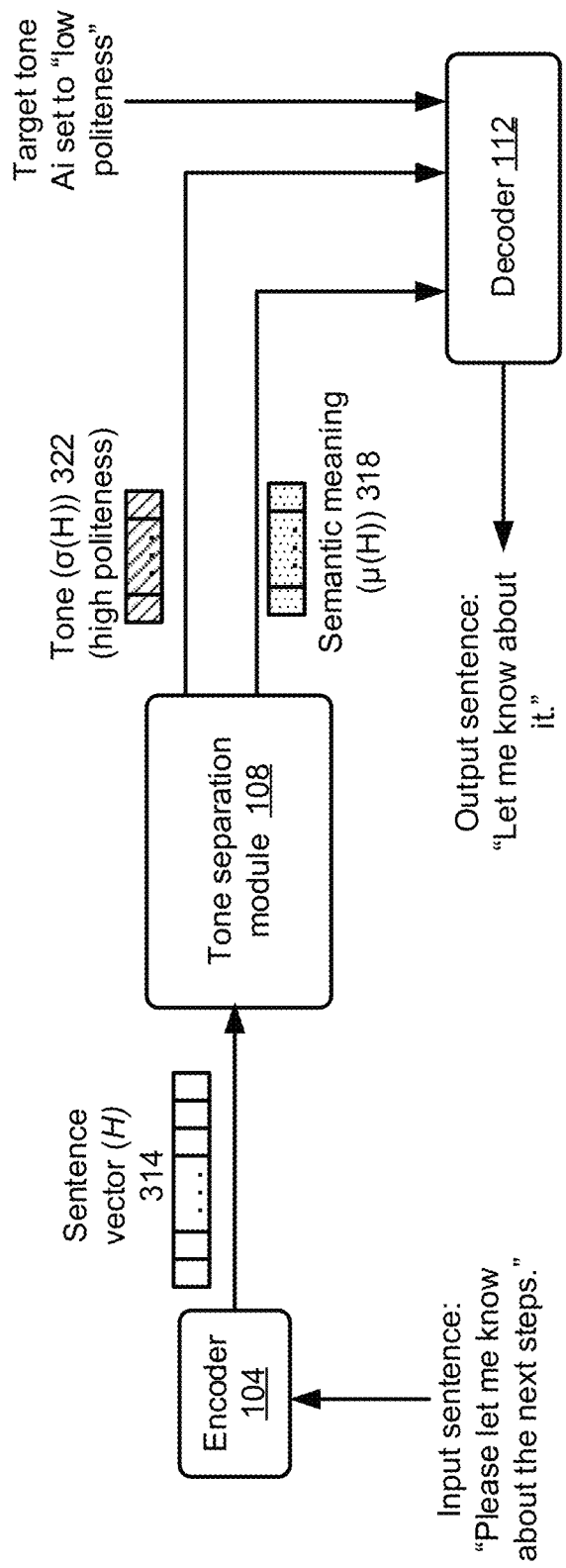
FIG. 4B schematically illustrates various operations associated with the method of FIG. 4A, in accordance with some embodiments.

FIG. 4A is a flowchart illustrating an example method 400 for modifying a tone of a sentence, without modifying a semantic meaning of the sentence, in accordance with some embodiments. FIG. 4B schematically illustrates various operations of the method 400 of FIG. 4A, in accordance with some embodiments. FIGS. 4A, 4B will be discussed herein in unison.

Method 400 of FIG. 4A can be implemented, for example, using the system architecture illustrated in FIGS. 1, 2 and/or 3, and described herein, such as by the tone modification system 102. However other system architectures can be used in other embodiments, as apparent in light of this disclosure. To this end, the correlation of the various functions shown in FIG. 4A to the specific components and functions illustrated in FIGS. 1-3 is not intended to imply any structural and/or use limitations. Rather, other embodiments may include, for example, varying degrees of integration wherein multiple functionalities are effectively performed by one system. In another example, multiple functionalities may be effectively performed by more than one system. For example, in an alternative embodiment, a first server may facilitate encoding an input sentence to generate a sentence vector, and a second server may provide functionality associated with modifying the tone of the sentence vector and generating the output sentence. In yet another embodiment, a client device (such as device 100, instead of a server) may modify the tone and/or may provide also functionality associated with modifying the tone. Thus, although various operations of the method 400 are discussed herein as being performed by the tone modification system 102 of the computing device 100, one or more of these operations can also be performed by the tone modification system 202 of the server 201 as well.

The method 400 includes, at 404, receiving an input sentence (e.g., by the system 102), such as input sentence 130 of FIGS. 1-3. As variously discussed herein, although a sentence is used herein as an example, the disclosure is not limited to receiving a sentence and changing a tone of the sentence—rather, instead of, or in addition to, a sentence, the teachings of this disclosure can be used to modify tone of sections of texts, phrases, paragraphs, or any appropriate digital content. The input sentence 130 is received from a user, for example, via an appropriate user interface. In the example of FIG. 4B, the input sentence is "Please let me know about the next steps," which is merely used as an example.

At 408, the input sentence 130 is pre-processed, e.g., by the pre-processor 303, as discussed variously with respect to FIG. 3. At 412, the input sentence 130 is encoded to generate a sentence vector. For example, as variously discussed with respect to FIG. 3, the encoder 104 encodes the input sentence 130 to generate the sentence vector H 314. FIG. 4B illustrates a schematic representation of the sentence vector H 314 having multiple entries.

At 416, the sentence vector is processed, to separate semantic meaning and tone within the sentence vector. Thus, a section of the sentence vector, that conveys the tone-independent semantic meaning of the input sentence, is identified. For example, as variously discussed with respect to FIG. 3, the tone separation module 108 generates the semantic meaning $\mu(H)$ 318 and the tone $\sigma(H)$ 322. The semantic meaning ($\mu(H)$) 318 represents the semantic meaning of the sentence vector H 314, and hence, the semantic meaning of the input sentence 130. The tone $\sigma(H)$ 322 represents the tone of the sentence vector H 314, and hence, the tone of the input sentence 130. FIG. 4B illustrates a representation of the semantic meaning ($\mu(H)$) 318 having multiple entries and tone $\sigma(H)$ 322 having multiple entries. Also, in the example of FIG. 4B, the tone $\sigma(H)$ 322 separated and predicted by the tone separation module 108 is "high politeness." It is to be noted that in some examples, each of the semantic meaning $\mu(H)$ 318 and tone $\sigma(H)$ 322 are in corresponding vector forms. As will be further appreciated, while the vectors 318 and 322 are shown as separate vectors, they can also be concatenated or otherwise separate portions of a single vector, as will be appreciated.

At 420, a target tone is received. For example, as variously discussed with respect to FIG. 3, the target tone Ai 134 is received by the decoder 112 from a user, for example, via an appropriate user interface. The target tone can be a desired measure of a target politeness and/or target degree of formality in the output sentence. In the example of FIG. 4B, the target tone Ai is set to "low politeness."

At 420, the decoder 112 also receives the separated semantic meaning and tone of the sentence vector, along with the target tone. For example, as variously discussed with respect to FIG. 3, the decoder 112 receives the semantic meaning μ(H) 318, and optionally the tone σ(H) 322, from the separation module 108, along with the target tone Ai 134. In an example, the target tone Ai 134, the semantic meaning μ(H) 318, and optionally the tone (σ(H)) 322 are concatenated to form a vector, which is input to the decoder 112. In another example embodiment, the tone (σ(H)) 322 is not received by the decoder 112.

At 424, an output sentence is generated, where the output sentence has similar semantic meaning as the input sentence, and has the target tone. The output sentence and the input sentence have similar semantic meaning in the sense that both the output sentence and the input sentence convey the same or similar idea or meaning, but with a different tone. For example, as variously discussed with respect to FIG. 3, the decoder 112 generates the output sentence 138 having the semantic meaning μ(H) 318 and the target tone Ai 134.

For example, in the example of FIG. 4B, the output sentence is "Let me know about it," which has a low politeness, as set by the target tone Ai. Thus, the input sentence "Please let me know about the next steps" (e.g., which is predicted to have the "high politeness" by the tone separation module 108) and the output sentence "Let me know about it" (e.g., which is generated to have the "low politeness" based on the target tone Ai) have different tones, but the same or similar semantic meaning.

Figure 5A:
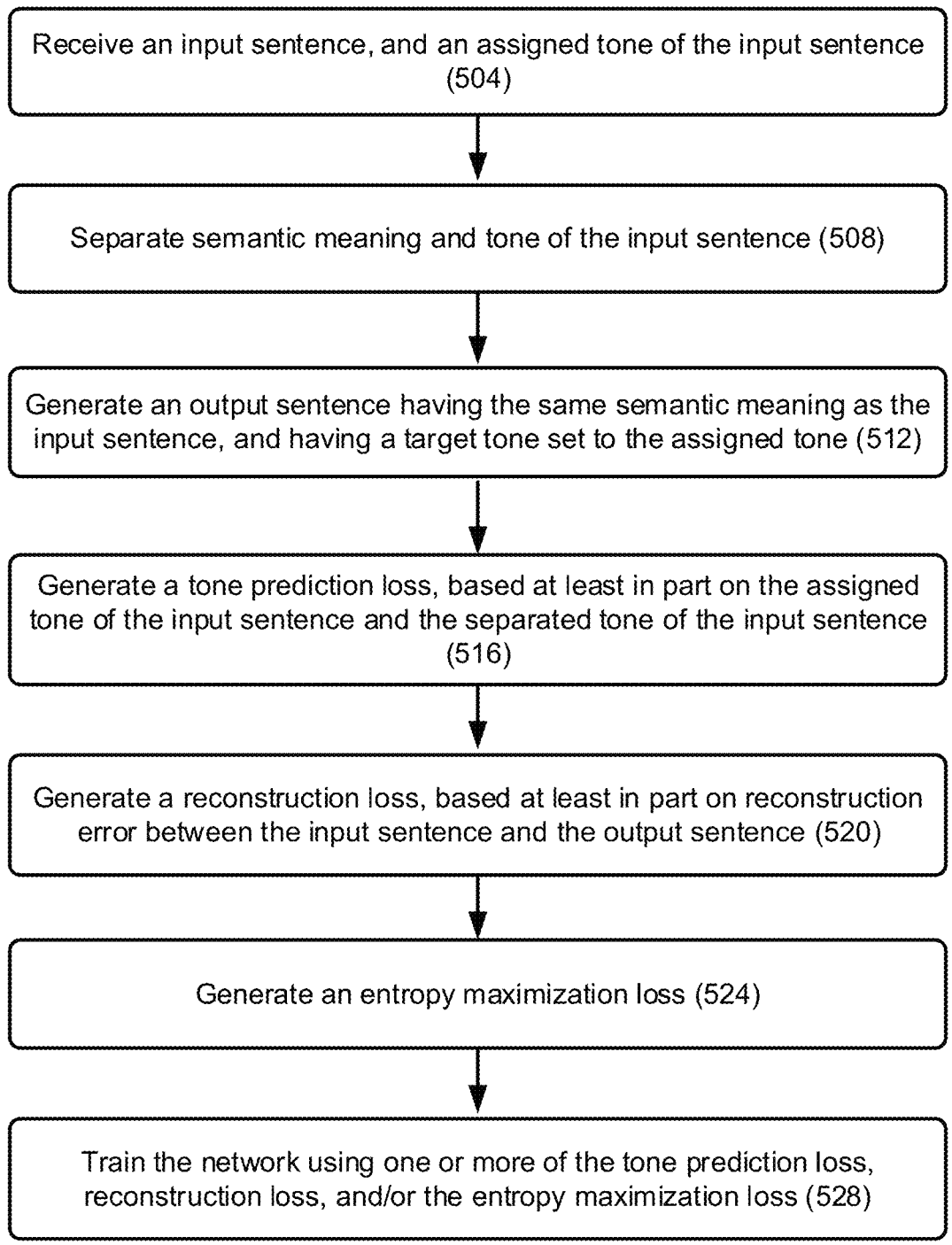
FIG. 5A is a flowchart illustrating an example method for training a sequence-to-sequence (seq2seq) model framework of a tone modification system, in accordance with some embodiments.
Figure 5B:
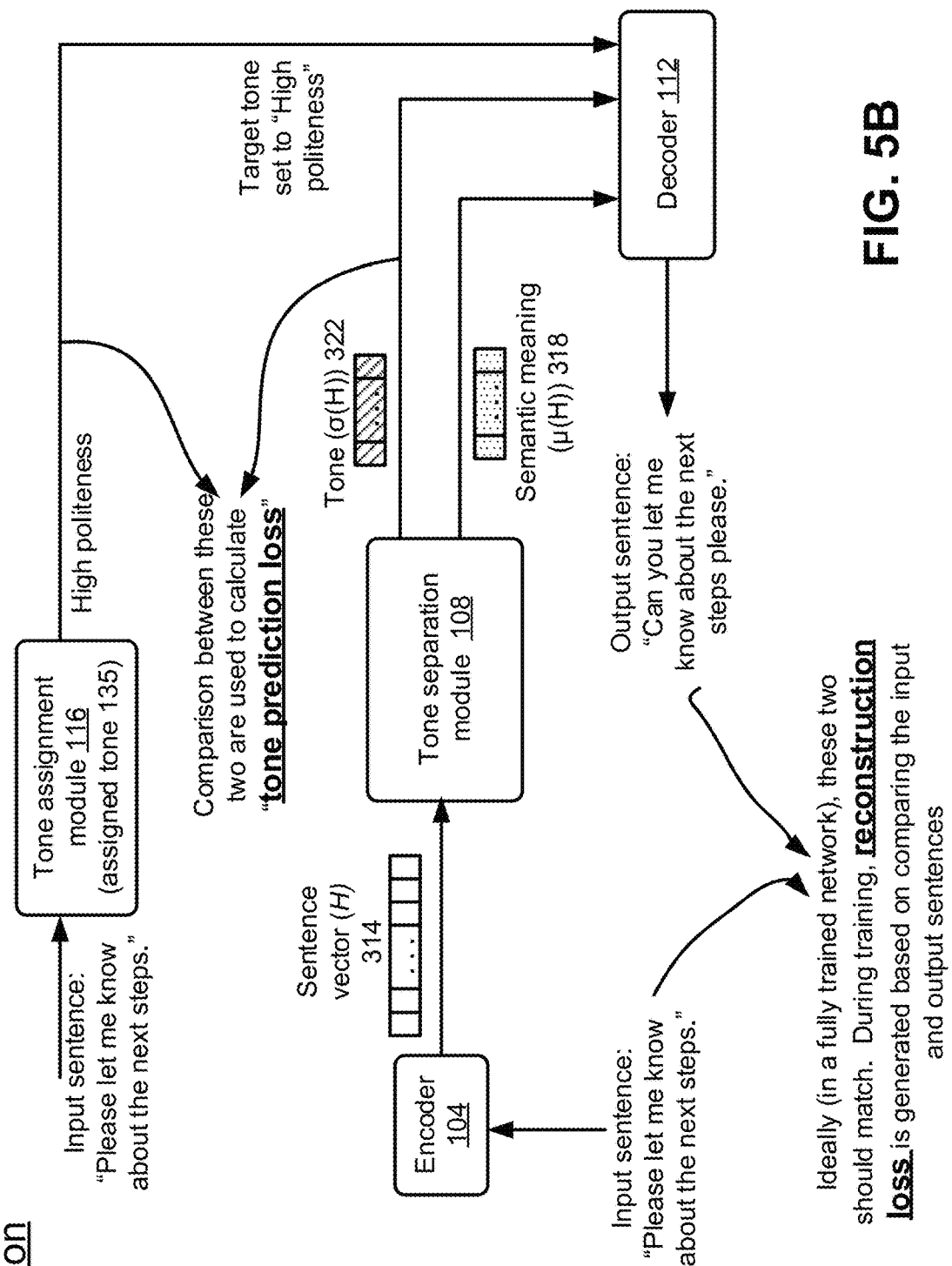
FIG. 5B schematically illustrates various operations associated with the method of FIG. 5A, in accordance with some embodiments.

FIG. 5A is a flowchart illustrating an example method 500 for training the sequence-to-sequence (seq2seq) model framework of the tone modification system 102 of FIGS. 1-3, in accordance with some embodiments. FIG. 5B schematically illustrates various operations of the method 500 of FIG. 5A, in accordance with some embodiments. FIGS. 5A, 5B will be discussed herein in unison.

Method 500 of FIG. 5A can be implemented, for example, using the system architecture illustrated in FIGS. 1, 2 and/or 3, and described herein, such as by the tone modification system 102. However other system architectures can be used in other embodiments, as apparent in light of this disclosure. To this end, the correlation of the various functions shown in FIG. 5A to the specific components and functions illustrated in FIGS. 1-3 is not intended to imply any structural and/or use limitations. Rather, other embodiments may include, for example, varying degrees of integration wherein multiple functionalities are effectively performed by one system. In another example, multiple functionalities may be effectively performed by more than one system, such as one or more servers, as discussed with respect to FIG. 2.

The method 500 comprises, at 504, receiving an input sentence, and an assigned tone of the input sentence. For example, the input sentence 130 and the assigned tone AT 135 of the input sentence 130 form part of a non-parallel corpus of training data for training the seq2seq model. As variously discussed with respect to FIGS. 1-3, the assigned tone AT 135 is received from the tone assigner 116. In the example of FIG. 5B, the input sentence is "Please let me know about the next steps." Note that although same input sentences are used in FIGS. 4B and 5B, this need not be the case, and does not limit the scope of this disclosure—in practice, different sentences can be, and are likely to be, used for the operational phase illustrated in FIG. 4B and the training phase illustrated in FIG. 5B. Also, in FIG. 5B, the tone assigner 116 assigns a tone of "high politeness" to this input sentence.

At 508, the method comprises separating (e.g., by the separation module 108) semantic meaning and tone of the input sentence, e.g., as variously discussed with respect to the operations at 416 of FIG. 4A and as also variously discussed with respect to FIGS. 1-3. Thus, the separation module 108 predicts the tone of the input sentence. The separated tone, as separated or predicted by the separation module 108, is also referred to as "input tone" of the input sentence, and/or also referred to as a "predicted tone" predicted by the separation module 108. FIG. 5B symbolically illustrates the semantic meaning μ(H) 318 and tone σ(H) 322 of the input sentence.

At 512, an output sentence is generated (e.g., by the decoder 112), the output sentence having the same semantic meaning as the input sentence and having a target tone, e.g., as variously discussed with respect to the operations at 424 of FIG. 4A and as also variously discussed with respect to FIGS. 1-3. During the training phase, the target tone is set to the assigned tone. Thus, in the example of FIG. 5B, the target tone set is to "high politeness," to match the assigned tone.

At 516, a tone prediction loss is generated, based at least in part on (i) the assigned tone of the input sentence, as assigned by the tone assigner 116, and (ii) the separated tone σ(H) 322 of the input sentence, as predicted by the separation module 108. The assigned tone of the input sentence is discussed with respect to operations at 504 of method 500, and the separated tone of the input sentence is discussed with respect to operations at 508 of method 500. The tone prediction loss $L_{tp}$ is discussed in further detail with respect to equation 4 herein previously. For example, FIG. 5B illustrates comparing the assigned tone of the input sentence and the separated tone σ(H) 322 of the input sentence to compute the tone prediction loss.

At 520, a reconstruction loss is generated, based at least in part on reconstruction error between the input sentence and the output sentence. The reconstruction loss, also referred to as sequence to sequence generation loss $L_{seq2seq}$, is discussed in further detail with respect to equation 5 herein previously. The reconstruction loss is indicative of difference between the input sentence and the output sentence. For example, in the example of FIG. 5B, the input sentence is assumed to have high politeness (e.g., based on the tone assigner 116 assigning the high politeness to the input sentence) and the output sentence is generated by the decoder 112 to have the target tone of high politeness. Thus, if the system 102 is fully trained, the input sentence and the output sentence should match. However, if the system 102 is not fully trained, the input sentence and the output sentence may not fully match. For example, in the example of FIG. 5B, the input sentence is "Please let me know about the next steps," and the output sentence is "Can you let me know about the next steps please." Although both sentences have the same semantic meaning and the same target tone of high politeness, there is a slight mismatch between the two sentences. The mismatch between the two sentences implies that the system 102 is not yet fully trained, and there is a reconstruction error. The reconstruction loss is generated by comparing the input sentence and the output sentence, e.g., as illustrated in FIG. 5B and as discussed with respect to equation 5 herein previously.

At 524, an entropy maximization loss is generated, e.g., as discussed in further detail with respect to equation 7 herein previously. At 528, the seq2seq neural is trained using one or more of the tone prediction loss, the reconstruction loss, and/or the entropy maximization loss. For example, equation 8 herein previously discusses a weighted total loss function, that can be used to train the network. The weights $w_{tp}$ and/or $w_{ent}$ of equation 8 are appropriately configured while training the system 102. For example, the training is carried out in batches, with one batch being trained to maximize loss function associated with entropy of adversary ($L_{ent}$) and minimize the reconstruction loss ($L_{seq2seq}$), while the next batch is used to train the separation module 108 to predict the tone (e.g., reduce ($L_{tp}$). In an example, the training is performed using Adam adaptive learning rate optimization algorithm.

FIG. 6 illustrates example original text and corresponding example modified text generated by the system 102, where the original text is perceived by the tone modification system 102 as having a low level of politeness, and the modified text has the same semantic meaning as the original text and is perceived by the tone modification module as having a relatively higher level of politeness, in accordance with some embodiments. For example, the tone modification system 102 replaces the underlined section of the original text having relatively low level of politeness with underlined text in the modified text having medium level of politeness, without changing the semantic meaning of the text, as discussed with respect to FIGS. 1-5B.

Table 1 below depicts examples of modification of politeness in various example phrases. The first column of the table indicates politeness of various input phrases, the second column of the table indicates the corresponding input phrases, the third column of the table indicates target politeness of corresponding modified output phrases, and the fourth column of the table indicates the corresponding output phrases. The system 102 receives an input phrase and a corresponding target politeness (and may optionally receive the input politeness generated by the tone assigner 116 for purposes of training the system 102), and generates the corresponding output phrase. Merely as an example, politeness is measured on a scale of 0-1. High politeness corresponds to about 0.9, medium to about 0.5, and low to about 0.

politeness. For example, the output phrase has some slang (e.g., "waiting till my nails grow") added, which decreases the politeness level.

In Table 1, for example, in the second row, the phrase "and they got the cheese steak just right" having a high degree of politeness has been modified to "they just got the cheese steak, potato and pepper right." In this example, while the semantic meaning of the phrase does not change significantly, the politeness somewhat drops (e.g., drops from high to medium), and the reordering of words suggests some degree of exasperation with the situation.

FIG. 7 illustrates plots 702, 704 depicting an accuracy in reconstructing output sentences (e.g., after words of the input sentences have been shuffled by introducing noise 310) by the tone modification system 102 of FIGS. 1-3 to have the same semantic meaning as corresponding input sentences, in accordance with some embodiments. The X axis represents time in epochs, and the Y axis represents accuracy in percentage. The plots 702 reflects a scenario where each word in an input sentence is to be shuffled only up to 3 words away from its original location. The plot 704 represents full sentence shuffle. As illustrated in FIG. 7, there is a significant drop in accuracy when full shuffle is allowed. As seen from the plot 702, the system 102 is able to reconstruct output sentences with over 95% accuracy (e.g., for 95% of the scenarios, an output sentence has the same semantic meaning as a corresponding input sentence), even with 3 words away shuffles.

FIG. 8 illustrates plots 802, 804 depicting a measure of perplexity in reconstructing output sentences (e.g., after words of the input sentences have been shuffled by introducing noise 310) by the tone modification system 102 of FIGS. 1-3, in accordance with some embodiments. The X axis represents time in epochs, and the Y axis represents perplexity in percentage. Perplexity represents a measure of randomness and confusion on the part of the system 102 in reconstructing the output sentence—a low degree of perplexity indicates that the system 102 is able to generate the output sentences with high confidence. The plots 802 reflects a scenario where each word in an input sentence is to be shuffled only up to 3 words away from its original location. The plot 804 represents full sentence shuffle. As illustrated in FIG. 8, in the plot 802, the perplexity drops significantly, e.g., to below 2%, over time and training, indicating that the

TABLE 1

| Input politeness | Input phrase | Target politeness | Output phrase |
|---|---|---|---|
| Medium | and of course no one has still returned my call | Low | one of my nails has returned and still no call |
| High | and they got the cheese steak just right | Medium | they just got the cheese steak, potato and pepper right |
| Medium | she tells well too bad the delivery driver has left | Low | she tells too bad the delivery driver has left |
| Medium | almost everything was very poor | Low | everything was almost very poor |
| High | i would suggest you stay here and take your business elsewhere | Medium | i would suggest you stay away and take your business elsewhere |
| High | please don't waste your time nor money, please trust here | Medium | anyway, please don't waste your time nor money here |

In Table 1, for example, in the first row, the phrase "and of course no one has still returned my call" has a medium degree of politeness, which has been modified to "one of my nails has returned and still no call" and has a low degree of system 102 is able to reconstruct output sentences with high confidence and precision.

Numerous variations and configurations will be apparent in light of the following examples.

Example 1. A method for generating an output sentence from an input sentence by replacing an input tone of the input sentence with a target tone, the method comprising: receiving the input sentence; generating a sentence vector that is representative of the input sentence; separating, based on the sentence vector, content of the input sentence from the input tone of the input sentence; receiving the target tone; and generating the output sentence based on the content of the input sentence and the target tone, such that (i) the output sentence and the input sentence have the same content, and (ii) the output sentence has the target tone that is different from the input tone of the input sentence.

Example 2. The method of example 1, wherein: the input tone is a measure of politeness in the input sentence; and the target tone is a desired measure of politeness in the output sentence.

Example 3. The method of any of examples 1-2, wherein: the input tone is a measure of formality in the input sentence; and the target tone is a desired measure of formality in the output sentence.

Example 4. The method of any of examples 1-3, wherein: the input tone is a measure of a sentiment in the input sentence; and the target tone is desired measure of a sentiment in the output sentence.

Example 5. The method of any of examples 1-4, wherein one or more of generating the sentence vector, separating the content from the input tone, and generating the output sentence are performed by a neural network framework, the method further comprising: training the neural network based on non-parallel training data that includes a plurality of input sentences and a corresponding plurality of tones, such that each input sentence of the plurality of sentences has a corresponding tone of the plurality of tones, wherein the training data is non-parallel in that it lacks, for individual input sentence of the plurality of input sentences of the training data, any corresponding output sentence.

Example 6. The method of any of examples 1-4, wherein the generating the sentence vector, separating the content from the input tone, and generating the output sentence are performed by a neural network framework, the method further comprising: training the neural network using non-parallel corpora of training data that includes a first input sentence and a predicted tone of the first input sentence, and does not include any output sentence having same content as the first input sentence.

Example 7. The method of any of examples 1-6, wherein generating the sentence vector comprises: embedding individual words of the input sentence into an input vector; transmitting the input vector to an encoder comprising a Gated Recurrent Unit (GRU); and outputting, by the encoder, the sentence vector.

Example 8. The method of any of examples 1-7, wherein generating the sentence vector comprises: adding noise to the input sentence by shuffling a word order in the input sentence; and generating the sentence vector from the input sentence, subsequent to adding the noise.

Example 9. The method of any of examples 1-8, wherein separating the content from the input tone comprises: feeding the sentence vector to a Mixture Density Network (MDN) that acts as an adversary to a sequence-to-sequence model, the MDN using a univariate gaussian model or a multivariate gaussian model; and separating, by the MDN and based on the sentence vector, content of the input sentence from the input tone of the input sentence.

Example 10. The method of example 9, further comprising: training the MDN by receiving a predicted tone of the input sentence, calculating a tone prediction loss, based on (i) the received predicted tone of the input sentence and (ii) the input tone of the input sentence that is separated by the MDN, and training the MDN, based on the tone prediction loss.

Example 11. The method of example 10, further comprising: training the MDN using Adam optimizer.

Example 12. The method of any of examples 1-11, wherein generating the output sentence comprises: generating a concatenated vector comprising at least the content of the input sentence and the target tone; and feeding the concatenated vector to a feedforward layer of a decoder that comprises a Gated Recurrent Unit (GRU), the GRU including an attention layer at its output.

Example 13. The method of any of examples 1-12, further comprising: generating a reconstruction loss that is indicative of content difference between the input sentence and the output sentence.

Example 14. The method of example 13, wherein the reconstruction loss is based on maximizing a cross entropy between words of the output sentence and words of the input sentence.

Example 15. A system comprising: one or more processors; and a tone modification system comprising a neural network and executable by the one or more processors to receive input digital content; separate a meaning of the input digital content from an input tone of the input digital content; receive a target tone; and generate output digital content that maintains the meaning of the input digital content and that has the target tone, the target tone being different from the input tone.

Example 16. The system of example 15, wherein the input tone is a measure of one or both of (i) a degree of politeness in the input digital content and/or (ii) a degree of formality of the input digital content.

Example 17. The system of any of examples 15-16, wherein the target tone is a measure of one or both of (i) a desired degree of politeness in the output digital content and/or (ii) a desired degree of formality of the output digital content.

Example 18. The system of any of examples 15-17, wherein: the tone modification system is trained using non-parallel training data that includes a plurality of input digital content and a corresponding plurality of input tones, such that each digital content of the plurality of digital contents has a corresponding tone of the plurality of tones; and the training data is non-parallel in that it lacks, for a first input digital content of the plurality of digital contents of the training data, any corresponding first output digital content.

Example 19. The system of any of examples 15-18, wherein to separate the meaning of the input digital content from the input tone of the input digital content, the tone modification system is to: generate a sentence vector that is a vector representation of the input digital content; and parse the sentence vector to separate the meaning of the input digital content from the input tone of the input digital content.

Example 20. The system of example 19, wherein to generate the sentence vector separate, the tone modification system is to: embed individual words of the input digital content into an input vector; transmit the input vector to an encoder comprising a Gated Recurrent Unit (GRU); and output, by the encoder, the sentence vector.

Example 21. The system of any of examples 19-20, wherein to generate the sentence vector separate, the tone modification system is to: add noise to the input digital content by shuffling a word order in the input digital content;

and generate the sentence vector from the input digital content, subsequent to adding the noise.

Example 22. The system of any of examples 19-21, wherein to separate the meaning of the input digital content from the input tone of the input digital content, the tone modification system is to: feed the sentence vector to a Mixture Density Network (MDN) that acts as an adversary to a sequence-to-sequence model, the MDN using a univariate gaussian model or a multivariate gaussian model; and separate, by the MDN and based on the sentence vector, the meaning of the input digital content from the input tone of the input digital content.

Example 23. The system of example 22, wherein the tone modification system is to: train the MDN by receiving a predicted tone of the input digital content, calculating a tone prediction loss, based on (i) the received predicted tone of the input digital content and (ii) the input tone of the input digital content that is separated by the MDN, and training the MDN, based on the tone prediction loss.

Example 24. The system of any of examples 15-23, wherein to generate the output digital content, the tone modification system is to: generate a concatenated vector comprising at least the meaning of the input digital content and the target tone; and feed the concatenated vector to a feedforward layer of a decoder of the tone modification system, the decoder comprising a Gated Recurrent Unit (GRU), the GRU including an attention layer at its output.

Example 25. The system of any of examples 15-24, wherein the tone modification system is to: generate a reconstruction loss that is indicative of an error in reconstructing the output digital content from the input digital content.

Example 26. The system of example 25, wherein the reconstruction loss is based on maximizing a cross entropy between words of the output digital content and words of the input digital content.

Example 27. A computer program product including one or more non-transitory machine-readable mediums encoded with instructions that when executed by one or more processors cause a process to be carried out for modifying a tone of an input sentence, the process comprising: receiving the input sentence; generating a sentence vector that is representative of the input sentence; separating, based on the sentence vector, content of the input sentence from the input tone of the input sentence; and generating an output sentence based on the content of the input text and a target tone, such that (i) the output sentence and the input sentence have the same content, and (ii) the output sentence has the target tone that is different from the input tone of the input sentence.

Example 28. The computer program product of example 27, wherein: the input tone is a measure of politeness in the input sentence; and the target tone is desired measure of politeness in the output sentence.

Example 29. The computer program product of any of examples 27-28, wherein: the input tone is a measure of formality in the input sentence; and the target tone is desired measure of formality in the output sentence.

Example 30. The computer program product of any of examples 27-29, wherein: the input tone is a measure of an affect in the input sentence; and the target tone is desired measure of an affect in the output sentence.

Example 31. The computer program product of any of examples 27-30, wherein separating the content from the input tone and/or generating the output sentence are performed by a neural network framework, the process comprising: training the neural network based on training data that includes a plurality of input sentences and a corresponding plurality of tones, such that each input sentence of the plurality of sentences has a corresponding tone of the plurality of tones.

Example 32. The computer program product of example 31, wherein the training data lacks, for a first input sentence of the plurality of sentences of the training data, any corresponding output sentence.

Example 33. The computer program product of any of examples 27-32, wherein generating the sentence vector comprises: embedding individual words of the input sentence into an input vector; transmitting the input vector to an encoder comprising a Gated Recurrent Unit (GRU); and outputting, by the encoder, the sentence vector.

Example 34. The computer program product of any of examples 27-33, wherein generating the sentence vector comprises: adding noise to the input sentence by shuffling a word order in the input sentence; and generating the sentence vector from the input sentence, subsequent to adding the noise.

Example 35. The computer program product of any of examples 27-34, wherein separating the content from the input tone comprises: feeding the sentence vector to a Mixture Density Network (MDN) that acts as an adversary to a sequence-to-sequence model, the MDN using a univariate gaussian model or a multivariate gaussian model; and separating, by the MDN and based on the sentence vector, content of the input sentence from the input tone of the input sentence Example 36. The computer program product of any of examples 27-35, wherein generating the output sentence comprises: generating a concatenated vector comprising at least the content of the input sentence and the target tone; and feeding the concatenated vector to a feedforward layer of a decoder that comprises a Gated Recurrent Unit (GRU), the GRU including an attention layer at its output.

Example 37. The computer program product of any of examples 27-36, wherein the process comprises: generating a reconstruction loss that is indicative of content difference between the input sentence and the output sentence.

Example 38. The computer program product of example 37, wherein the reconstruction loss is based on maximizing a cross entropy between words of the output sentence and words of the input sentence.

Example 39. A server comprising the computer program product of any of examples 27-38.

Example 40. A client-server system comprising the computer program product of any of examples 27-39.

The foregoing detailed description has been presented for illustration. It is not intended to be exhaustive or to limit the disclosure to the precise form described. Many modifications and variations are possible in light of this disclosure. Therefore, it is intended that the scope of this application be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A tone conversion method comprising:
    receiving an input sentence having a semantic meaning and an input tone indicative of one or more observed characteristics of the input sentence, the one or more observed characteristics including one or more of politeness or formality;
    generating a sentence vector that is representative of the input sentence;

feeding the sentence vector to a neural network that models at least one tone dimension using a gaussian model, acts as an adversary to a sequence-to-sequence framework, and has been trained on non-parallel pairs of training data;

separating, by the neural network and based on the sentence vector, the semantic meaning of the input sentence from the input tone of the input sentence;

identifying a portion of the sentence vector that is associated with the semantic meaning of the input sentence;

receiving a target tone that is different from the input tone, wherein the target tone is indicative of one or more desired characteristics of an output sentence, the one or more desired characteristics including one or more of politeness or formality; and generating the output sentence based on (i) the portion of the sentence vector that is associated with the semantic meaning and (ii) the target tone, the output sentence having the semantic meaning of the input sentence and the target tone.

2. The method of claim 1, wherein generating the sentence vector comprises:

embedding individual words of the input sentence into an input vector;

transmitting the input vector to an encoder comprising a gated recurrent unit; and outputting, by the encoder, the sentence vector.

3. The method of claim 1, wherein generating the sentence vector comprises:

adding noise to the input sentence by modifying a word order in the input sentence; and generating the sentence vector from the input sentence, subsequent to adding the noise.

4. The method of claim 1, wherein: the neural network is a Mixture Density Network (MDN) that models a single tone dimension using a univariate gaussian model or models multiple tone dimensions using a multivariate gaussian model.

5. The method of claim 4, further comprising: training the MDN by receiving an assigned tone of the input sentence, generating a tone prediction loss, based on (i) the assigned tone of the input sentence and (ii) the input tone of the input sentence that is separated by the MDN, and training the MDN, based on the tone prediction loss.

6. The method of claim 1, wherein generating the output sentence comprises:

generating a concatenated vector comprising (i) the portion of the sentence vector that is associated with the semantic meaning and (ii) a vector representation of the target tone; and feeding the concatenated vector to a feedforward layer of a decoder that comprises a gated recurrent unit (GRU), the GRU including an attention layer at its output.

7. The method of claim 1, further comprising:

receiving training data that include at least (i) a training input sentence and (ii) an assigned tone that is assigned to the training input sentence;

generating a training sentence vector that is representative of the training input sentence;

separating, based on the training sentence vector, a semantic meaning of the training input sentence from a tone of the training input sentence;

setting a training target tone to match with the assigned tone;

generating a training output sentence based on the semantic meaning of the training input sentence and the training target tone; and generating a reconstruction loss, based on the training input sentence and the training output sentence.

8. The method of claim 7, wherein generating the reconstruction loss comprises: generating the reconstruction loss based on a cross entropy between words of the training output sentence and words of the training input sentence.

9. The method of claim 8, further comprising: training the sequence-to-sequence framework by aiming to minimize the reconstruction loss.

10. A system comprising:

one or more processors; and a tone modification system comprising a neural network that models at least one tone dimension using a gaussian model, has been trained on non-parallel pairs of training data, and is executable by the one or more processors to receive input digital content having a semantic meaning and an input tone indicative of one or more observed characteristics of the input digital content;

generate a sentence vector that is a vector representation of the input digital content;

feed the sentence vector to the neural network;

separate, by the neural network and based on the sentence vector, a semantic meaning of the input digital content from an input tone of the input digital content;

receive a target tone that is indicative of one or more desired characteristics of an output sentence; and generate output digital content that substantially maintains the semantic meaning of the input digital content and that has the target tone, the target tone being different from the input tone.

11. The system of claim 10, wherein: the tone modification system is trained using training data that includes a plurality of training digital content items and a corresponding plurality of training tones.

12. The system of claim 10, wherein the neural network is a Mixture Density Network (MDN) that acts as an adversary to a sequence-to-sequence model.

13. The system of claim 10, wherein the tone modification system is further executable by the one or more processors to:

embed individual words of the input digital content into an input vector;

transmit the input vector to an encoder comprising a Gated Recurrent Unit (GRU); and output, by the encoder, the sentence vector.

14. The system of claim 10, wherein: the neural network models a single tone dimension using a univariate gaussian model or models multiple tone dimensions using a multivariate gaussian model.

15. The system of claim 10, wherein to generate the output digital content, the tone modification system is further executable by the one or more processors to:

generate a concatenated vector comprising at least the semantic meaning of the input digital content and the target tone; and feed the concatenated vector to a feedforward layer of a decoder of the tone modification system, the decoder comprising a Gated Recurrent Unit (GRU), the GRU including an attention layer at its output.

16. A computer program product including one or more non-transitory machine-readable mediums encoded with instructions that when executed by one or more processors cause a process to be carried out for modifying an input tone of an input sentence, the process comprising:

receiving the input sentence, the input sentence having a semantic meaning and the input tone, wherein the input tone is indicative of one or more observed characteristics of the input sentence, the one or more observed characteristics including one or more of politeness or formality;

generating a sentence vector that is representative of the input sentence;

generating, based on the sentence vector, a first vector representing a tone-independent semantic meaning of the input sentence and a second vector representing the input tone of the input sentence, wherein the first and second vectors are generated using a probabilistic distribution derived from a neural network that models at least one tone dimension using a gaussian model, acts as an adversary to a sequence-to-sequence framework, and has been trained on non-parallel pairs of training data; and generating an output sentence based on the first vector and a target tone, wherein the target tone is indicative of one or more desired characteristics of the output sentence, the one or more desired characteristics including one or more of politeness or formality, such that (i) the output sentence and the input sentence have similar tone-independent semantic meaning, and (ii) the output sentence has the target tone that is different from the input tone of the input sentence.

17. The computer program product of claim 16, the process further comprising: training the neural network based on training data that include a plurality of training sentences and a corresponding plurality of training tones.

18. The computer program product of claim 16, wherein generating the sentence vector comprises:

embedding individual words of the input sentence into an input vector;

transmitting the input vector to an encoder comprising a Gated Recurrent Unit (GRU); and outputting, by the encoder, the sentence vector.

19. The computer program product of claim 16, wherein the neural network is a Mixture Density Network (MDN).

20. The computer program product of claim 16, wherein the neural network is a Mixture Density Network (MDN) that models a single tone dimension using a univariate gaussian model or multiple tone dimensions using a multivariate gaussian model.

* * * * *